(12) United States Patent
Sherer et al.

(10) Patent No.: US 12,507,806 B2
(45) Date of Patent: Dec. 30, 2025

(54) RAIL SYSTEM FOR ATTACHING ACCESSORIES

(71) Applicant: Insight 2 Design, LLC, Overland Park, KS (US)

(72) Inventors: Brandon Sherer, Overland Park, KS (US); Tyler Shannon, Overland Park, KS (US); Alex Marshall, Overland Park, KS (US); Braiddey Ruzicka, Overland Park, KS (US)

(73) Assignee: Insight 2 Design, LLC, Overland Park, KS (US)

( * ) Notice: Subject to any disclaimer, the term of this patent is extended or adjusted under 35 U.S.C. 154(b) by 344 days.

(21) Appl. No.: 18/126,666

(22) Filed: Mar. 27, 2023

(65) Prior Publication Data

US 2023/0301438 A1    Sep. 28, 2023

Related U.S. Application Data

(60) Provisional application No. 63/323,842, filed on Mar. 25, 2022.

(51) Int. Cl.
*A47C 7/62* (2006.01)
*A47B 97/00* (2006.01)
*A47C 21/00* (2006.01)

(52) U.S. Cl.
CPC ............... *A47C 7/62* (2013.01); *A47B 97/00* (2013.01); *A47C 21/00* (2013.01); *A47B 2200/0085* (2013.01)

(58) Field of Classification Search
CPC .......... A47C 7/62; A47C 7/624; A47B 97/00; A47B 2200/0085; A47B 3/083; A47B 37/04; A47G 23/0225; A47G 29/083; F16M 13/022
See application file for complete search history.

(56) References Cited

U.S. PATENT DOCUMENTS

| | | | | |
|---|---|---|---|---|
| 5,390,383 A | * | 2/1995 | Carn | A61G 13/12 5/624 |
| 5,538,215 A | * | 7/1996 | Hosey | A61G 13/101 248/229.11 |
| 6,119,878 A | * | 9/2000 | Zen | A47F 5/0846 248/222.51 |
| 8,621,692 B1 | * | 1/2014 | Kring | A61G 13/101 5/503.1 |
| 2010/0096521 A1 | * | 4/2010 | White | A47G 23/0225 248/314 |
| 2018/0338622 A1 | * | 11/2018 | Doolan | A47C 4/10 |

* cited by examiner

*Primary Examiner* — Fredrick C Conley
(74) *Attorney, Agent, or Firm* — John H. Choi & Associates

(57) ABSTRACT

A system for attaching accessories includes at least one rail operably coupled to an object. The at least one rail is elongate and has an inner surface and an opposing outer surface. The system also includes at least one accessory having an accessory clip for attaching to the at least one rail. The accessory clip includes a flexible member having an inner surface and an opposing outer surface, and a static member having an inner surface and an opposing outer surface. In an engaged state, the inner surface of the static member is engaged with the inner surface of the at least one rail, and the inner surface of the flexible member is engaged with the outer surface of the at least one rail.

20 Claims, 28 Drawing Sheets

RAIL SYSTEM FOR ATTACHING ACCESSORIES

CROSS-REFERENCE TO RELATED APPLICATION

This application claims priority to U.S. Provisional Application No. 63/323,842 titled "Table with Outer Rail System," filed on Mar. 25, 2022, which is incorporated by reference in its entirety.

FIELD

This invention relates to rail systems, and more particularly, to a rail system incorporated into furniture and other objects for attaching accessories.

BACKGROUND

There are many products used by consumers that lack certain features concerning convenience of use. In many instances, it is desirable to be hands-free. However, many commonly used products do not accommodate for storing everyday items while the product is in use. In fact, examples of consumer products that lack hands-free capability are limitless.

One type of consumer product that lacks hands-free capability is furniture. As an example, cup holders are not provided on most furniture and as a result, a user's hand is occupied from holding the cup or the user is required to place the cup elsewhere such as an uneven ground surface where the cup is not secure. If the type of furniture is a table, the user can place the cup on the table surface but this takes up valuable space. When the user needs space on the table, unnecessary items must be removed to provide the needed space. This problem exists with many other products including, but not limited to, for example, chairs, cots, coolers and even transportable wagons.

With respect to tables, they come in many different forms and are used for many different purposes. Among them are folding tables. Folding tables are often utilized temporarily, and when not in use, folded and stored. Folding tables are especially useful for use outdoors. However, transportable folding tables are often small because they are designed to fit in an automobile for transport. As such, the overall surface area of transportable folding tables is relatively small and limited. Due to the limited surface area of transportable folding tables, often times users are forced to hold objects in their hands or put them down in undesirable places such as an uneven ground surface or a place distant from the table. Folding tables are also often used for recreational activities. For example, games such as beer pong are often played on folding tables instead of on expensive dining tables. In such a scenario, objects other than game playing materials must not be on the table. As such, players and spectators must hold such objects, such as a beverage container, because there is no place to rest the objects. Therefore, a need exists for a means for attaching accessories to a table without taking up space on the table surface. This need exists for many other consumer products as well.

Many folding tables are constructed of blow-molded plastic due to relatively low manufacturing cost and because weight is minimized, thus making it easier to transport. However, blow-molded tables can be easily damaged, especially along the edges and corners, because the tables are not sufficiently protected along the edges and corners. As such, during transport and use, the edges and corners are vulnerable to damage. Therefore, a need also exists for strengthening the edges and corners of tables to prevent damage during transport and use. This need exists for many other consumer products as well.

Folding tables are also difficult to fold and unfold because the user must grip the blow-molded plastic portion of the table when folding and unfolding, which is often times slippery. Therefore, a further need exists for providing the user a better grip of the table when unfolding, folding and transporting the table. This need exists for many other consumer products as well.

Another problem with tables in the prior art is that they are not easily expandable. While table leaves are available, it is time consuming and difficult to install and uninstall. Also, table leaves are inconvenient to store as they are often stored separately and away from the table. Therefore, a need exists for a convenient way to expand tables.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present invention overcomes the disadvantages of many consumer products and provides additional benefits. For example, the present invention provides a folding table that is reinforced along the edges and corners with a rail system to prevent damage thereto. The present invention also provides a folding table having a rail system for securely attaching accessories so that objects could be stored therein or thereon without taking up space on the limited usable surface area of the folding table. Additionally, the rail system of the present invention provides the user better gripping for folding and unfolding the table. The advantages provided by the present invention applies to many other consumer products as well.

In one aspect, the system disclosed herein provides: at least one rail operably coupled to an object forming a space therebetween, the at least one rail being elongate and having an inner surface and an opposing outer surface; and at least one accessory, the accessory having an accessory clip for attaching to the at least one rail, the accessory clip comprising: a flexible member having an inner surface and an opposing outer surface, a static member having an inner surface and an opposing outer surface, a reinforcement member positioned on the outer surface of at least one of the flexible member and the static member, wherein the flexible member, static member and reinforcement member are integrally formed together, and wherein an inner portion is formed between the flexible member and the static member; wherein in an engaged state, the static member is positioned within the space and the inner surface of the static member is engaged with the inner surface of the at least one rail, and the inner surface of the flexible member is engaged with the outer surface of the at least one rail, such that the inner portion encompasses the at least one rail.

In another aspect, the system disclosed herein provides: at least one rail operably coupled to an object, the at least one rail being elongate and having an inner surface and an opposing outer surface; and at least one accessory, the accessory having an accessory clip for attaching to the at least one rail, the accessory clip comprising: a flexible member having an inner surface and an opposing outer surface, and a static member having an inner surface and an opposing outer surface; wherein in an engaged state, the inner surface of the static member is engaged with the inner surface of the at least one rail, and the inner surface of the flexible member is engaged with the outer surface of the at least one rail.

In yet another aspect, the system disclosed herein provides; a rail operably coupled to an object, the rail being elongate and having an inner surface and an opposing outer surface; and an accessory, the accessory having an accessory clip for attaching to the rail, the accessory clip comprising a flexible member having an inner surface and an opposing outer surface; wherein in an engaged state, the inner surface of the flexible member is engaged with one of the inner surface and outer surface of the rail.

BRIEF DESCRIPTION OF DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

Figure 1:
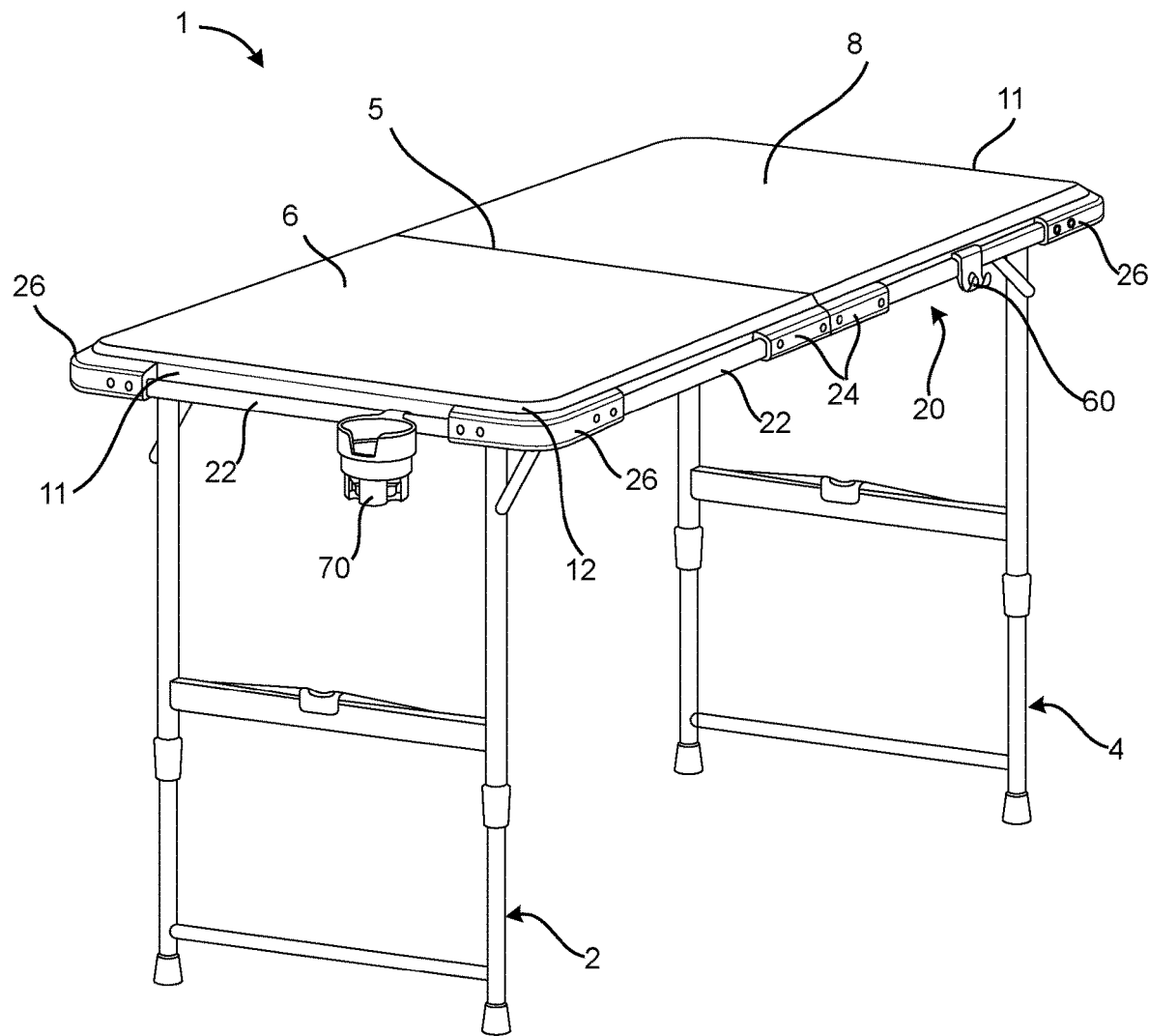
FIG. 1 is a perspective view of an embodiment of a folding table having a rail system of the present invention.

To facilitate an understanding of the invention, identical reference numerals have been used, when appropriate, to designate the same or similar elements that are common to the figures. Further, unless stated otherwise, the features shown in the figures are not drawn to scale but are shown for illustrative purposes only.

DETAILED DESCRIPTION

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left may be used to describe the accompanying figures. The terminology includes the words above specifically mentioned, derivatives thereof, and words of similar import.

Referring to FIG. 1, an embodiment of a table 1 of the present invention is shown. In this embodiment, the table 1 is a folding table generally having a pair of extendable opposing leg assemblies 2, 4 coupled to a frame (not shown). The leg assemblies 2, 4 are foldable toward the frame. The frame includes a first half and a second half (not shown) pivotably coupled with each other about a mid-point 5.

Still referring to FIG. 1, each of the first and second halves of the frame is fixed to first and second table tops 6, 8, respectively, for supporting the same. As such, the first and second table tops 6, 8 are pivotable about the mid-point 5. The first and second table tops 6, 8 are constructed of blow-molded plastic, and include side edges 10, end edges 11 and corners 12. That is, the table tops 6, 8 are constructed with blow-molded plastic and are therefore formed with empty space between outer surfaces thereof, as shown, for example, in FIGS. 4 and 5. In this embodiment, the frame is fixed to the table tops 6, 8 via form-fit or friction-fit such that fasteners are not required. In other words, inner surfaces of the table tops 6, 8 are formed with indents shaped and sized for receiving the frame. In other embodiments, the frame could be fixed to the table tops 6, 8 via fasteners or the like.

In further embodiments, the table 1 could be constructed without a frame and instead include a hinge mechanism coupled directly to the table tops 6, 8 at the mid-point 5. As a result, the leg members 2, 4 could be pivotably coupled directly to the table tops 6, 8 as well.

Figure 1A:
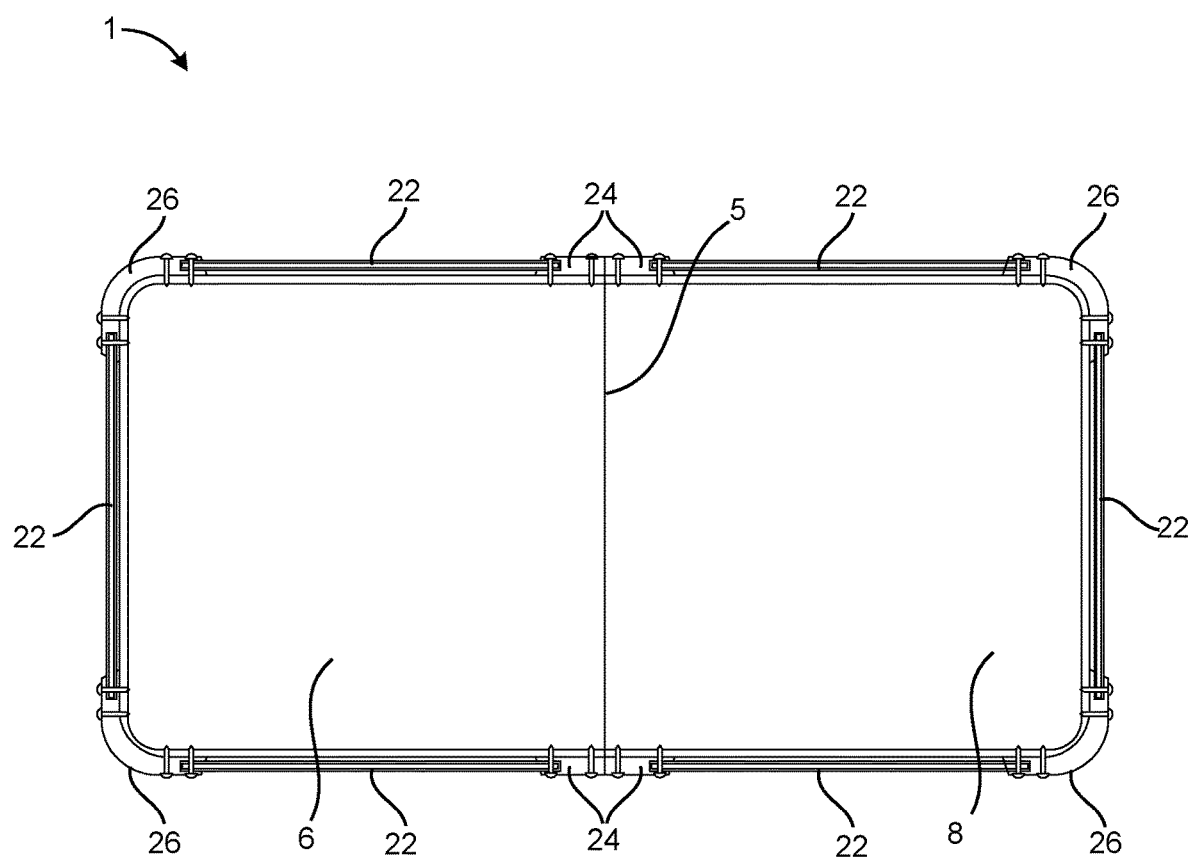
FIG. 1A a top view of the table of FIG. 1.
Figure 2:
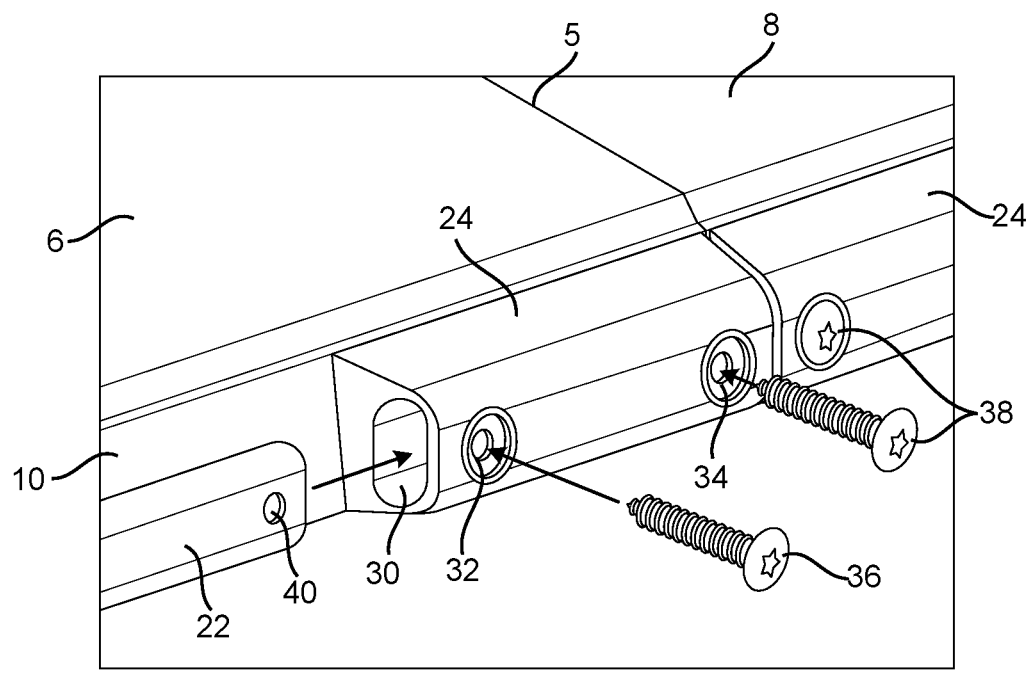
FIG. 2 is a perspective view of a side of the table of FIG. 1.
Figure 3:
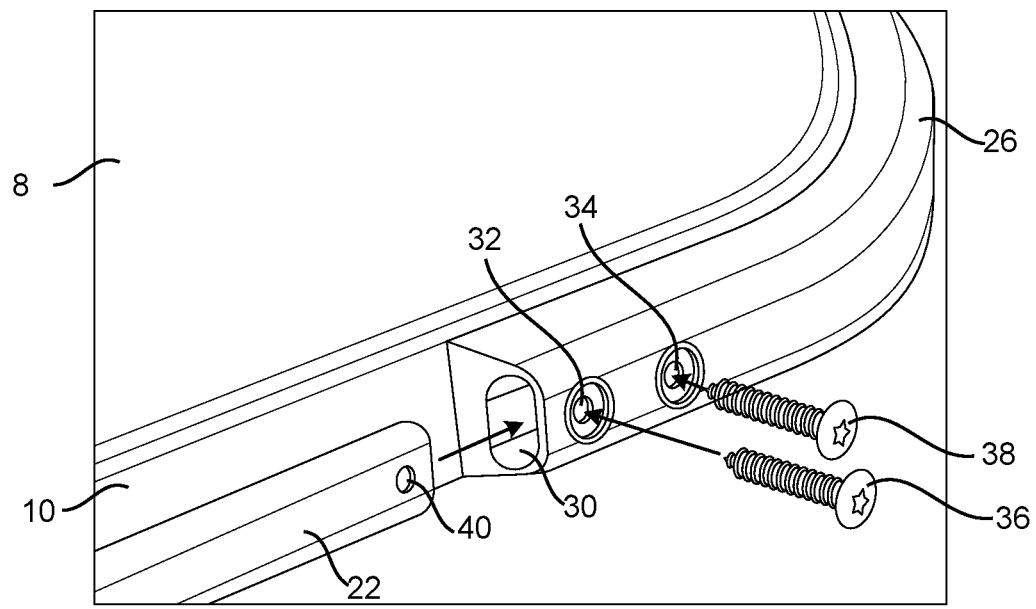
FIG. 3 is a perspective view of a corner of the table of FIG. 1.

Referring to FIGS. 1 and 1A, the table 1 includes a rail system 20, which surrounds the table top side edges 10, end edges 11 and corners 12. The rail system 20 comprises a plurality of tubing or rails 22 for covering the side edges 10 and end edges 11, a plurality of side bumpers 24 attached to sections of the side edges 10 proximate the mid-point 5, and a plurality of corner bumpers 26 attached to the corners 12. As shown in the figures, the side bumpers 24 are sized and shaped to conform with the side edges 10 of the table tops 6, 8, and the corner bumpers 26 are sized and shaped to conform with the corners 12 of the table tops 6, 8. In this embodiment, the tubing or rail 22 is constructed of metal and the bumpers 24, 26 are constructed of plastic, but one of ordinary skill in the art will recognize that other materials could be used without departing from the spirit and scope of the invention. Also, in this embodiment the tubing or rails 22 and bumpers 24, 26 have a hollow interior but in other embodiments, the tubing or rails 22 and bumpers 24, 26 could be solid throughout or partially solid.

Figure 4:
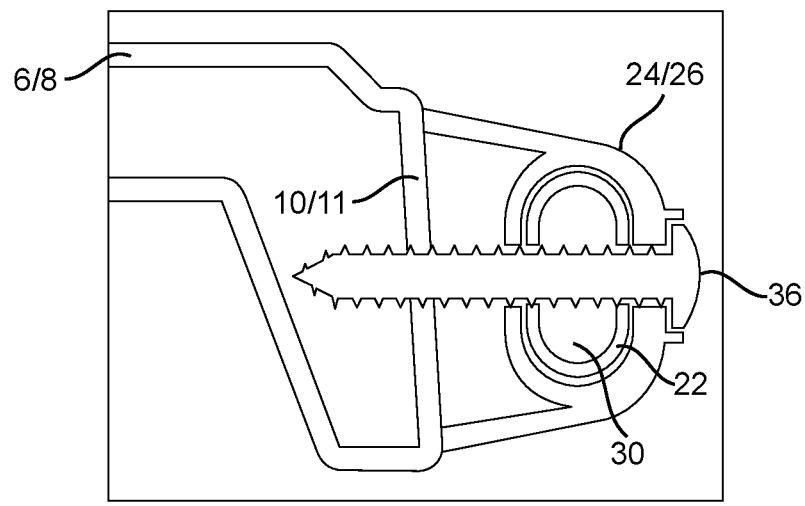
FIGS. 4 and 5 are sectional views of the side and end edges of the table of FIG. 1.
Figure 5:
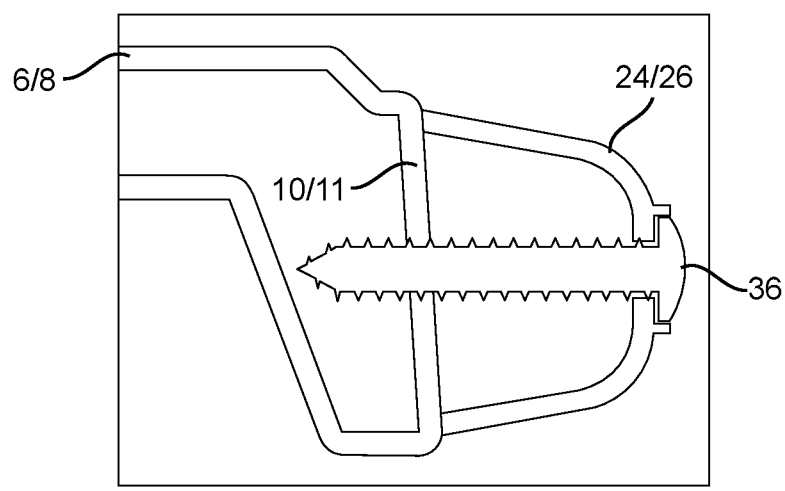
Figure 6:
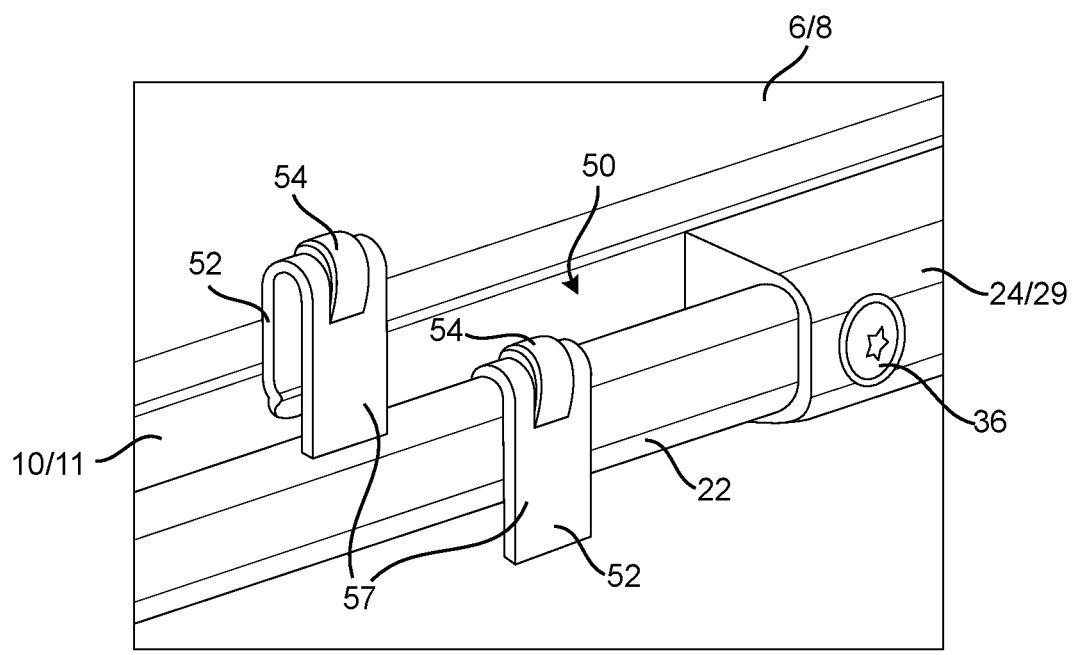
FIG. 6 is a perspective view of a rail or tubing of the table of FIG. 1, with a partial view of an embodiment of an accessory clip mounted thereto, viewed from the outside of the table.
Figure 7:
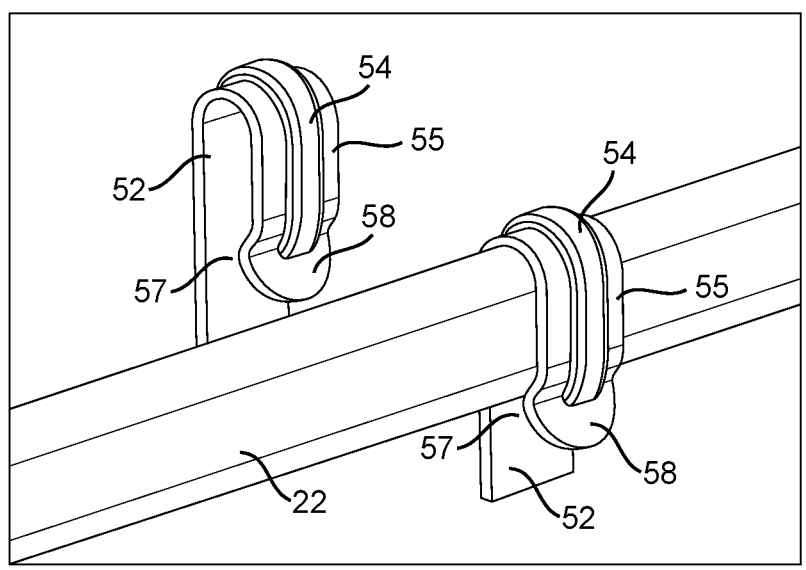
FIG. 7 is a perspective view of a rail of the table of FIG. 1, with a partial view of the accessory clip of FIG. 6 mounted thereto, viewed from the inside of the table.

Referring to FIGS. 2-5, each side bumper 24 includes a channel 30 for receiving the tubing or rail 22. The channel 30 is sized and shaped substantially similar to the tubing or rail 22 to receive the tubing or rail 22 without much frictional resistance. The side bumper 24 also includes a first aperture 32 and a second aperture 34 for receiving a first fastener 36 and a second fastener 38, respectively. In this embodiment, the fasteners 36, 38 are conventional screws but other types of fasteners could be used without departing from the spirit and scope of the invention. Also, in this embodiment, the channel 30 extends partially through the side bumper 24, as shown in FIGS. 4 and 5. That is, the side bumper 24 is formed by injection molding plastic and the mold is configured to form the channel 30 only proximate the first aperture 32 to save on material cost. However, in other embodiments, the channel 30 could extend further through the side bumper 24. For purposes of clarity, the second aperture 34 of each side bumper 24 refers to the aperture proximate the mid-point 5.

Still referring to FIGS. 2-5, similarly, each corner bumper 26 includes a channel 30 on each end for receiving the tubing or rail 22. The channel 30 is sized and shaped substantially similar to the tubing or rail 22 to receive the tubing 22 without much frictional resistance. The corner bumper 26 also includes a first aperture 32 and a second aperture 34 on each end for receiving a first fastener 36 and second fastener 38, respectively. In this embodiment, the fasteners 36, 38 are conventional screws but other types of fasteners could be used without departing from the spirit and scope of the invention. Also, in this embodiment, the channel 30 extends partially through the corner bumper 24, as shown in FIGS. 4 and 5. That is, the corner bumper 26 is formed by injection molding plastic and the mold is configured to form the channel 30 only proximate the first aperture 32 so save on material cost. However, in other embodiments, the channel 30 could extend further through the corner bumper 24. For purposes of clarity, the second aperture 34 of each corner bumper 26 refers to the aperture proximate the table top corner 12.

Referring again to FIGS. 2-5, the tubing 22 includes an aperture 40 on each end with each aperture 40 extending therethrough. The ends of the tubing 22 are positioned within the channels 30 of the side bumpers 24 and fixed to side edges or walls 10 of the table tops 6, 8 by extending the first fastener 36 through the first aperture 32, tubing aperture 40 and side wall 10 of the table top 6, 8. The second fastener 38 is extended through the second aperture 34 and the side wall 10 of the table top 6, 8 to further secure the side bumpers 24 and tubing or rails 22 to the table tops 6, 8. In similar fashion, the ends of the tubing or rail 22 are positioned within the channels 30 of the corner bumpers 26 and fixed to side walls 10 and end edges or walls 11 of the table tops 6, 8 by extending the first fastener 36 through the first aperture 32, tubing or rail aperture 40 and side wall 10 and end wall 11 of the table top 6, 8. The second fastener 38 is extended through the second aperture 34 and the side wall 10 and end wall 11 of the table top 6, 8 to further secure the corner bumpers 26 and tubing 22 to the table tops 6, 8.

Referring to FIGS. 6-10D, as a result of the installation of the tubing or rails 22 and bumpers 24, 26 to the table tops 6, 8, a space 50 (see FIG. 6) is formed between the side and end walls 10, 11, and the tubing 22. The space 50 is provided so that an accessory clip of an accessory is capable of secure attachment thereto. The accessory clip could be an integral part of any accessory. Such accessory clips and accessories are described in more detail below.

Figure 8:
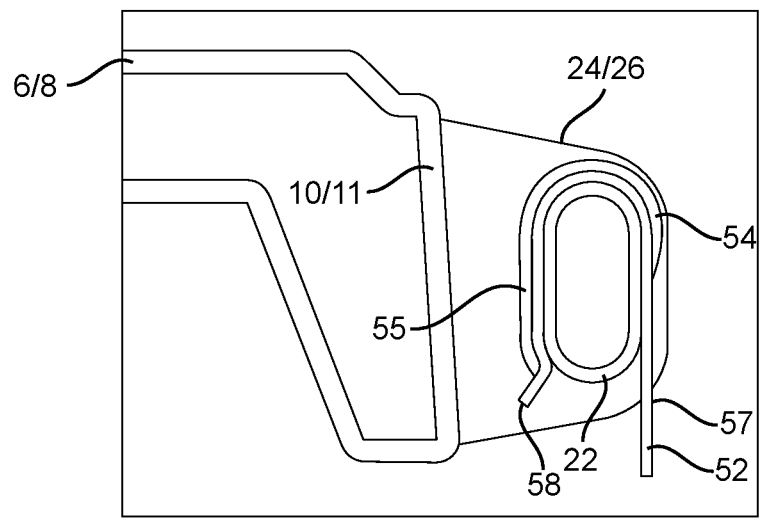
FIGS. 8 and 9 are sectional views of the side of the table of FIG. 1 illustrating how the accessory clip of FIGS. 6 and 7 is mounted to the rail.
Figure 9:
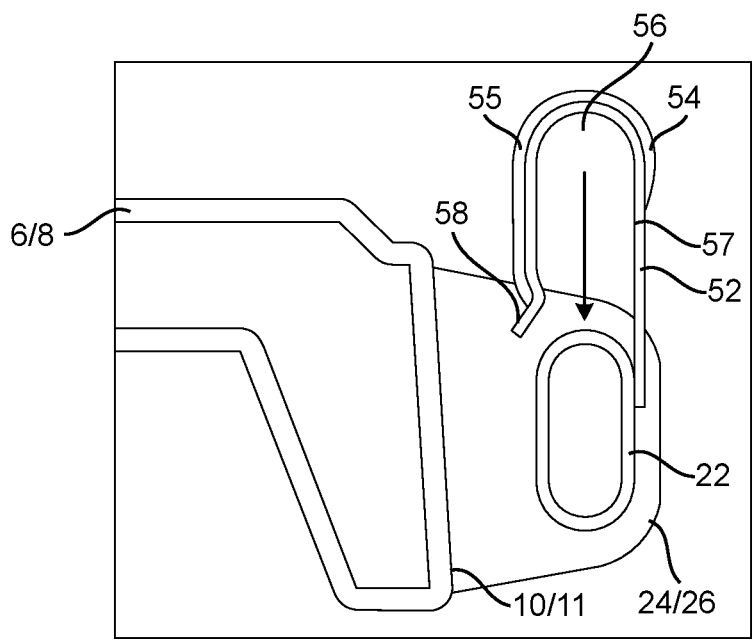
Figure 15:
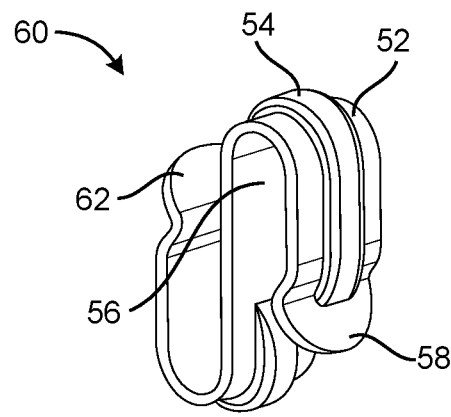
FIG. 15 is a perspective view of a hook of the present invention.
Figure 16:
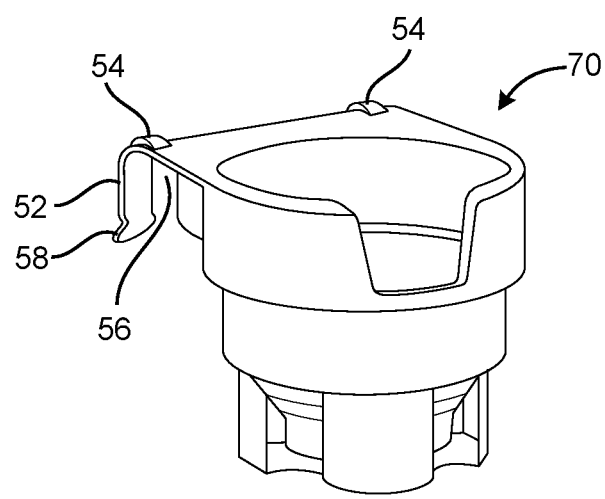
FIG. 16 is a perspective view of an embodiment of a cup holder of the present invention.

Referring to FIGS. 6-9, an embodiment of an accessory clip 52 is shown. The accessory clip 52 is configured to support accessories that hang from the rail 22, i.e., accessories that are positioned lower than the rail 22 or table top 6. For example, as shown in FIG. 15, the accessory clip 52 could be a part of a single hook 60 having a hook portion 62 for hanging items therefrom. As another example, as shown in FIG. 16, the accessory clip 52 could be a part of a cup holder 70 for storing beverages. In this embodiment, the accessory clip 52 includes a flexible member 55 and an opposing static member 57 as well as a reinforcement member 54 on outer surfaces thereof for providing additional strength and durability. The accessory clip 52 is integrally formed by injection molding plastic. Also, the accessory clip 52 can be integrally formed with the accessory, as shown in FIGS. 15 and 16, by plastic injection molding. The flexible member 55 is shaped and sized to fit within the space 50 between the table edges 10, 11 and the rail 22. An inner portion 56 of the accessory clip 52 is shaped and sized substantially similar to the tubing or rail 22. However, a lower portion 58 of the accessory clip 52 is shaped a sized with smaller dimensions than the tubing or rail 22 such that when the accessory clip 52 is installed downward on the tubing or rail 22, as shown in FIG. 9, the lower portion 58 expands while engaging the rail or tubing 22, and at a lowermost position, as shown in FIG. 8, the flexible member 55 contracts while the lower portion 58 engages a bottom portion of the tubing or rail 22 with sufficient frictional force to secure the accessory clip 52 on the tubing or rail 22. To uninstall, the user engages the lower portion 58 away from the tubing or rail 22 while pulling the accessory clip 52 upward.

Figure 10A:
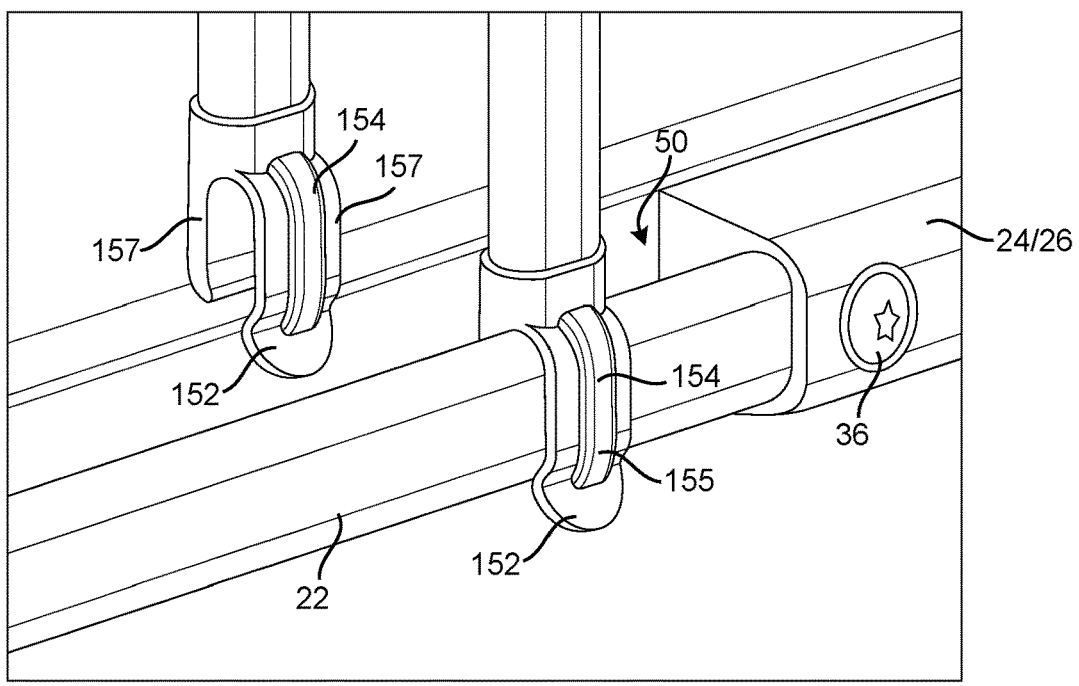
FIG. 10A is a perspective view of a rail or tubing of the table of FIG. 1, with a partial view of another embodiment of an accessory clip mounted thereto, viewed from the outside of the table.
Figure 10B:
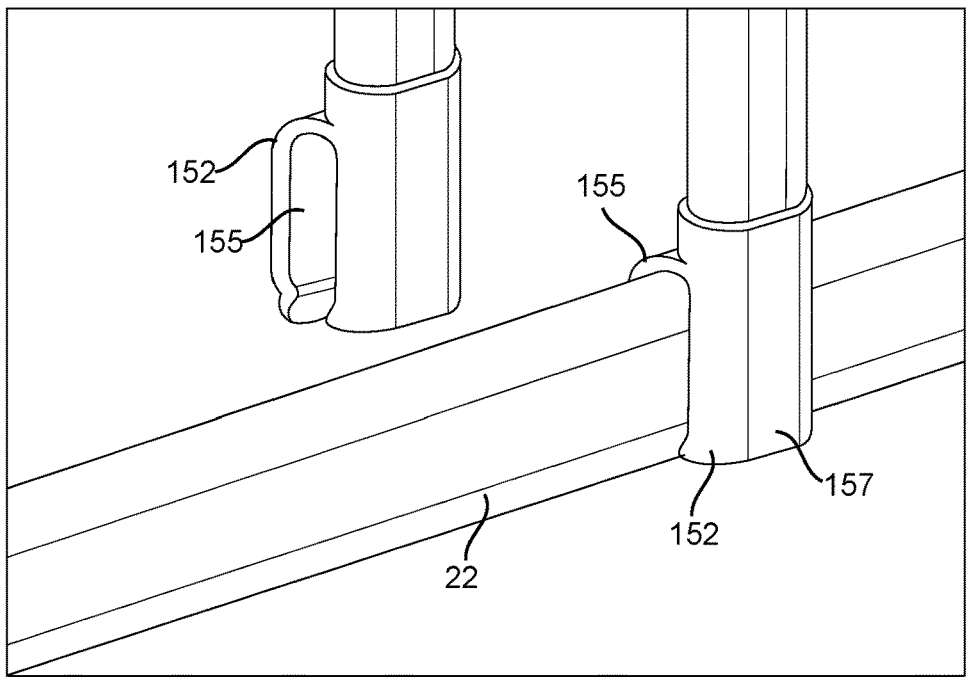
FIG. 10B is a perspective view of a rail or tubing of the table of FIG. 1, with a partial view of the accessory clip of FIG. 10A mounted thereto, viewed from the inside of the table.
Figure 10C:
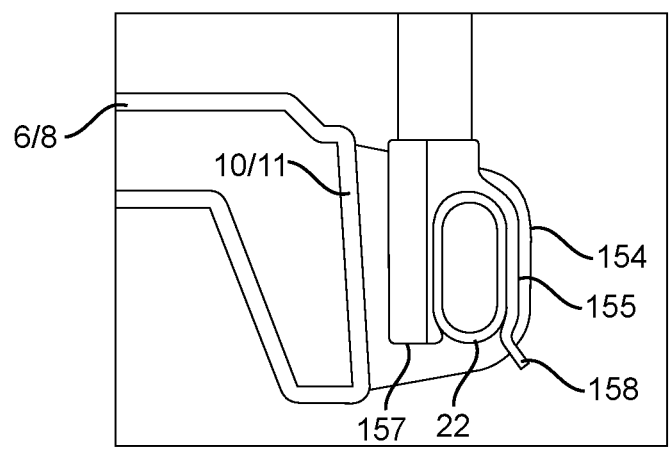
FIGS. 10C and 10D are sectional views of the side of the table of FIG. 1 illustrating how the accessory clip of FIGS. 10A and 10B is mounted to the rail.
Figure 10D:
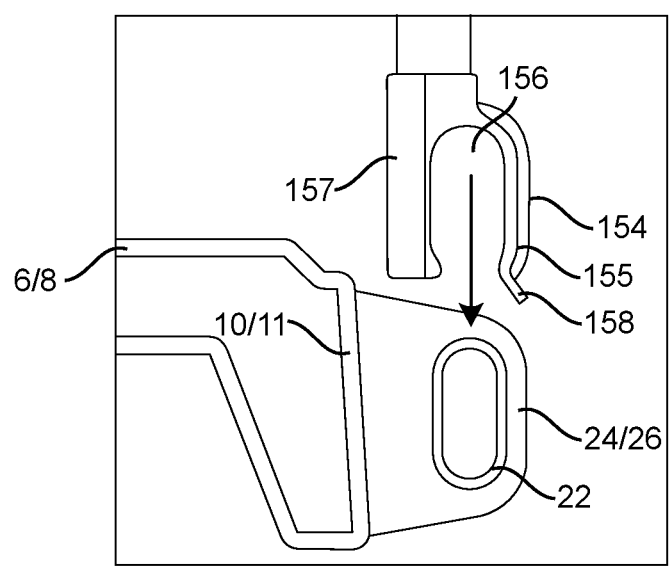
Figure 13:
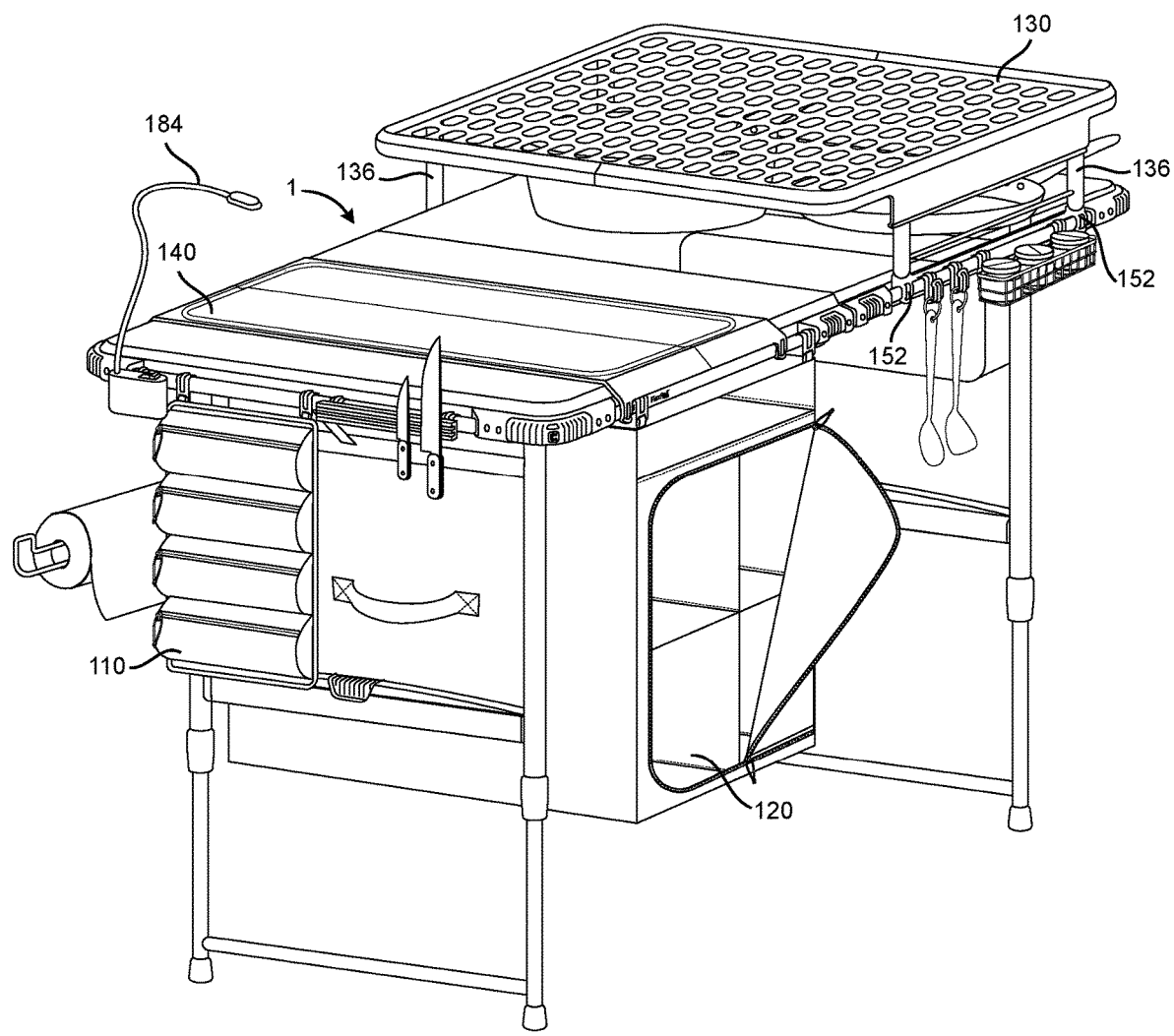
FIG. 13 is an illustration of the folding table of FIG. 1 with a variety of accessories attached to the rails.
Figure 14:
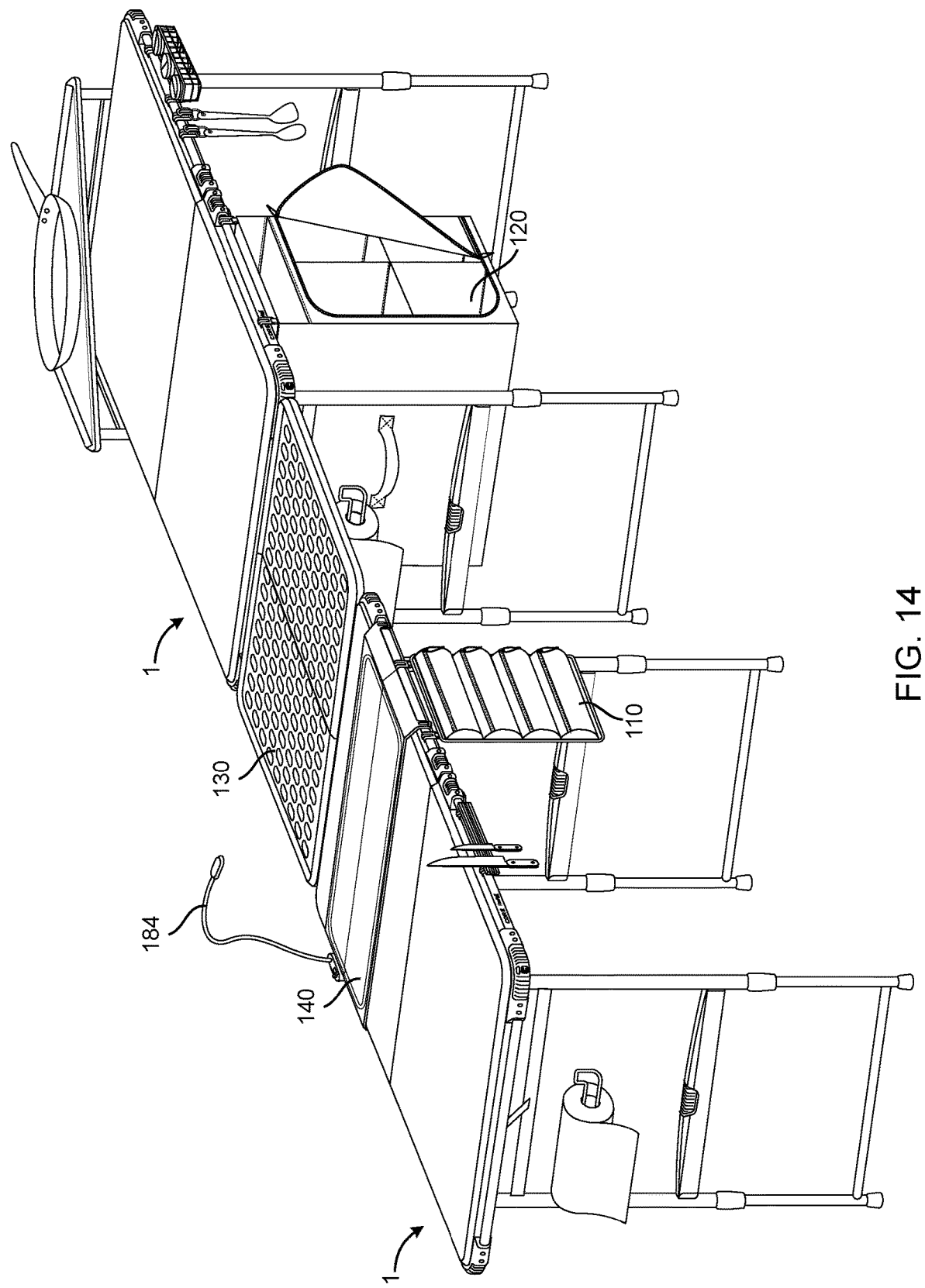
FIG. 14 is an illustration of two folding tables of FIG. 13 attached together using the rails of the tables.

Referring to FIGS. 10A-D, another embodiment of an accessory clip 152 is shown. The accessory clip 152 is configured for attaching accessories above the rail 22, as shown, for example, in FIGS. 13 and 14. In this embodiment, the accessory clip 152 is formed by plastic injection molding and attached to the accessory. That is, the accessory clip 152 is attached to legs of accessories such as an elevated grill surface 130 and an elevated table surface, as shown in FIGS. 13 and 14. However, in other embodiments, the accessory clip 152 could be integrally formed with the accessory by injection molding plastic. The accessory clip 152 includes a flexible member 155 and opposing static member 157, and a reinforcement member 154 at an upper section thereof for providing additional strength and durability. The static member 157 is shaped and sized to fit within the space 50 between the table edges 10, 11 and the rail 22. An inner portion 156 of the accessory clip 152 is shaped and sized substantially similar to the tubing or rail 22. However, a lower portion 158 of the accessory clip 152 is shaped a sized with smaller dimensions than the tubing or rail 22 such that when the accessory clip 152 is installed downward on the tubing or rail 22, as shown in FIG. 10D, the lower portion 158 of the flexible member 155 expands while engaging the tubing or rail 22, and at a lowermost position, as shown in FIG. 10C, the flexible member 155 contracts while the lower portion 158 engages a bottom portion of the tubing or rail 22 with sufficient frictional force to secure the accessory clip 152 on the tubing or rail 22. To uninstall, the user engages the lower portion 158 away from the tubing or rail 22 while pulling the accessory clip 152 upward.

Figure 11A:
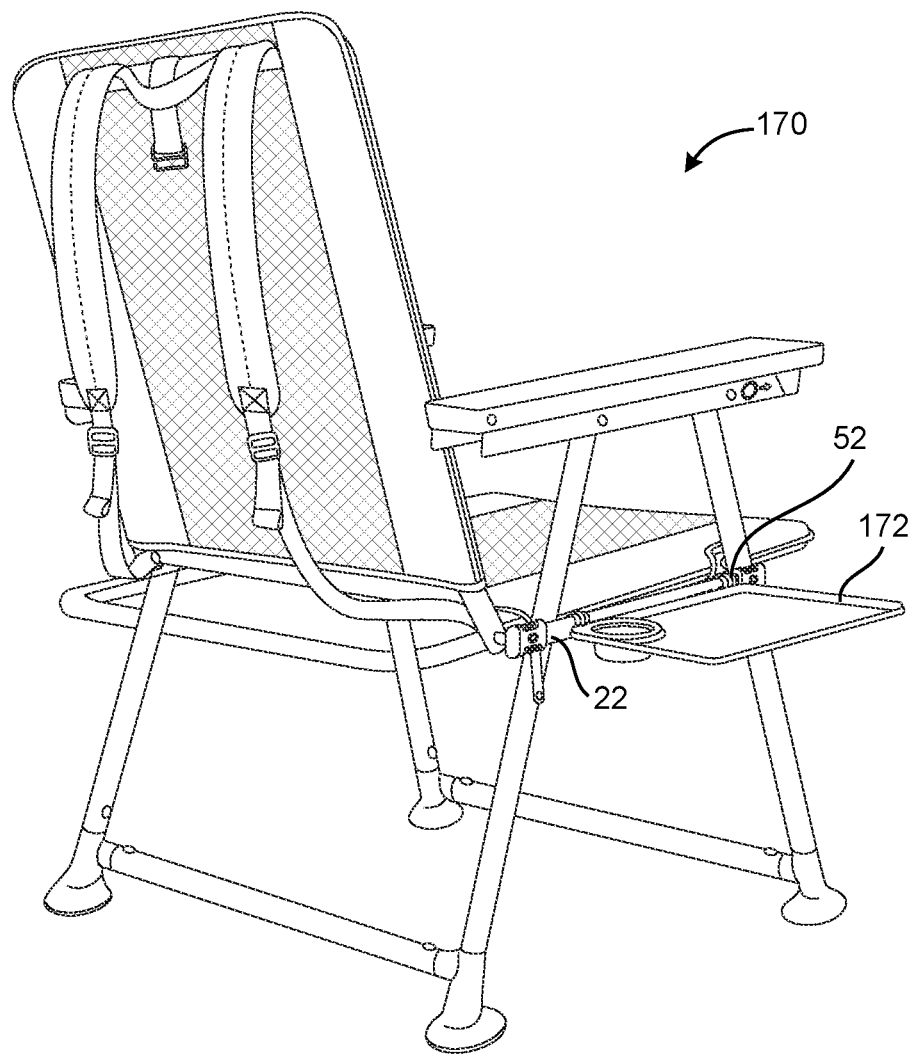
FIGS. 11A and 11B are illustrations of a folding chair having the rail system of the present invention.
Figure 11B:
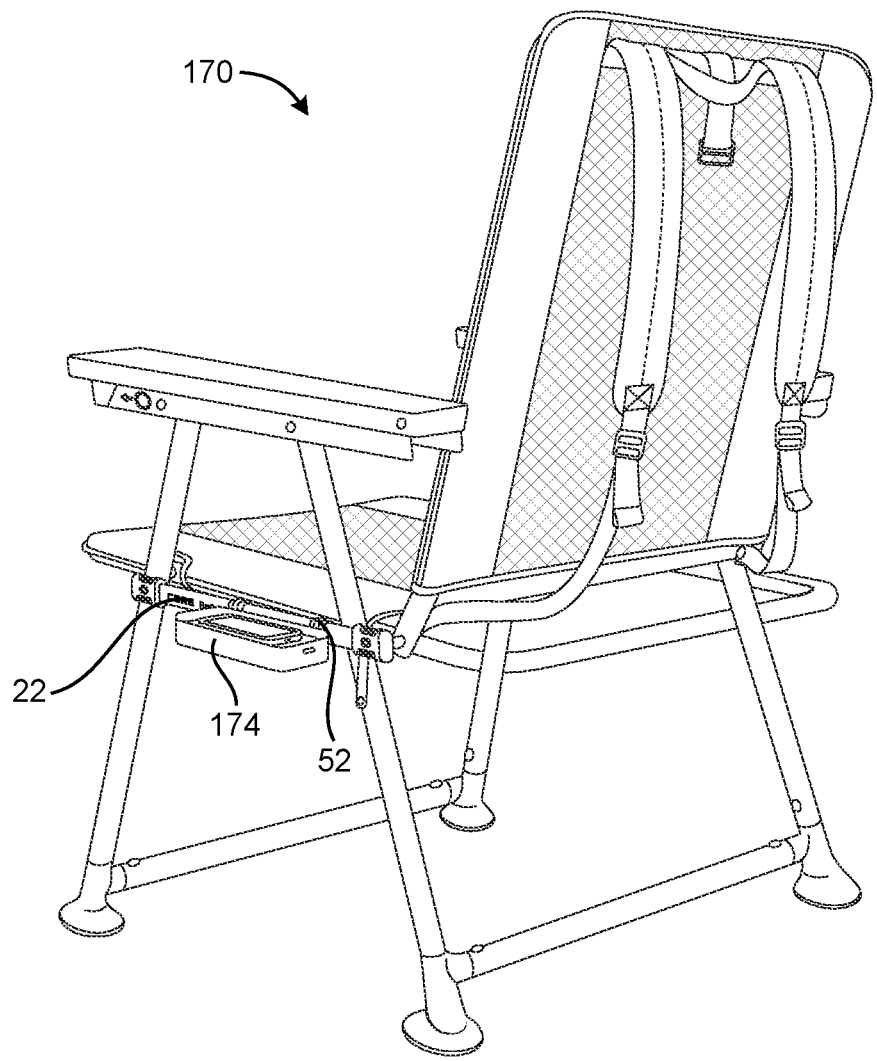
Figure 12:
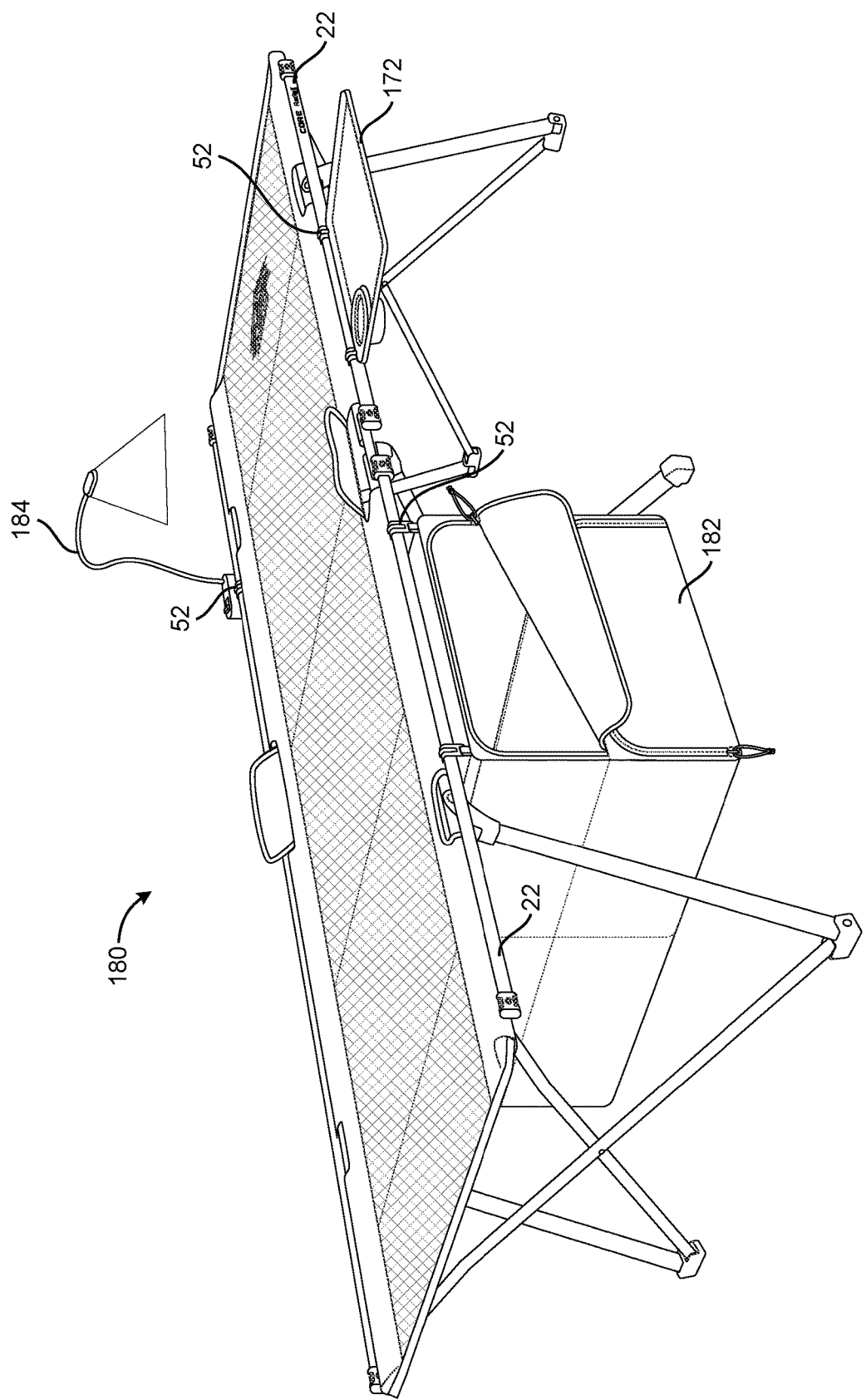
FIG. 12 is an illustration of a folding cot having the rail system of the present invention.

Referring to FIGS. 11A-12, the rail system 20 of the present invention could be incorporated into a variety of products, for example, chairs, cots, coolers and even transportable wagons. In FIGS. 11A and 11B, a folding chair 170 is shown with a rail 22 on side portions thereof. In one example, as shown in FIG. 11A, a side table 172 having the accessory clip 52 described above is attached to the rail 22. In another example, as shown in FIG. 11B, a battery bank and mobile phone holder 174 having the accessory clip 52 described above is attached to the rail 22 for wireless charging of a mobile phone. In FIG. 12, a folding cot 180 is shown with a rail 22 on side portions thereof. Various accessories such as a side table 172, storage unit 182 and reading light 184 having the accessory clip 52 described above are attached to the rail 22.

FIGS. 13 and 14 show the rail system 20 in use on a folding table 1. Various accessories are shown attached to the rails 22, for example, a flexible light 184, a cutting board 140, a storage roll 110, an under-table storage unit 120, an accessory storage unit, utensil hooks 60, a spice basket, a knife rack, an elevated grill surface 130 and an elevated table surface. As mentioned above, the accessories that hang from the rail 22 can utilize the accessory clip 52 and the accessories that are positioned above the rail 22 can utilize the accessory clip 152. Some of the accessories shown in FIGS. 13 and 14 are described in more detail below.

Figure 17A:
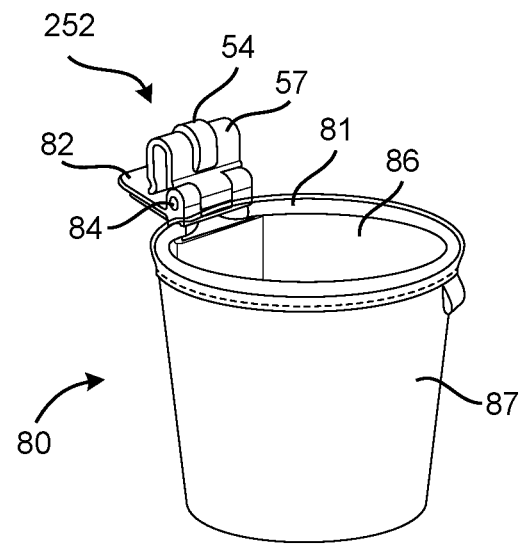
FIG. 17A is a perspective view of another embodiment of a cup holder of the present invention.
Figure 17B:
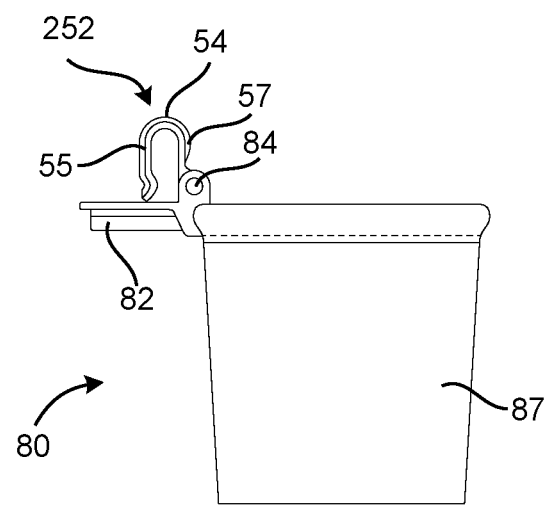
FIG. 17B is a side view of the cup holder of FIG. 17A.
Figure 17C:
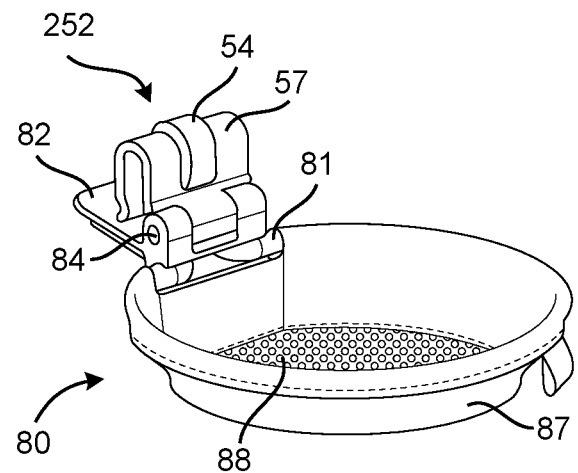
FIG. 17C a perspective view of the cup holder of FIG. 17A in a collapsed state.

Referring to FIGS. 17A-17C, another embodiment of a cup holder 80 is shown. The cup holder 80 includes a body section 87 constructed of a fabric material, which includes a bottom section 88 constructed of a mesh fabric. A top portion of the body section 87 is stitched around a substantially circular wire rim 81 for providing support and forms an opening 86 for receiving a cup. The wire rim 81 is constructed of a metal for strength and durability but other materials such as plastic could be used. In this embodiment, the static member 57 of the accessory clip 52 is pivotably coupled to a base member 82 by a pin 84, and the flexible member 55 is positioned above the base member 82 when in an engaged state, i.e., when the accessory clip 52 is engaged with the rail 22. For convenience, the accessory clip 52, base member 82 and pin 84 combination will be described as accessory clip 252. This accessory clip 252 embodiment is also used with other accessories described below. In this embodiment, the wire rim 81 and pin 84 are constructed of metal but other materials such as plastic can be used. The base member 82 is fixed to the wire rim 81 and as a result, the position of the base member 82 is fixed. The accessory clip 52 is pivotable such that the flexible member 55 and the static member 57 are perpendicular to the base member 82 in the engaged state, as shown in the figures, and the accessory clip 52 is capable of pivoting inward toward the opening 86 when not engaged with the rail 22. As such, when the cup holder 80 is installed on the rail 22, the accessory clip 52 is first pivoted inward towards the opening 86 and fastened to the rail 22 as described above. For the sake of brevity, the method of attaching the accessory clip 52 to the rail 22 described above is incorporated by reference. Then the cup holder 80 is pivoted downward and the base member 82 engages a bottom portion of the rail 22 to provide additional stability and support for the cup holder 80. When not in use the body section 87 is capable of collapsing, as shown in FIG. 17C, for convenient storage. While the cup holder 80 is substantially cylindrical having a round opening and bottom section, the cup holder 80 could take on other forms as well. For example, the opening 86 and bottom section 88 could be square and the depth of the cup holder 80 could extend lower.

Figure 18A:
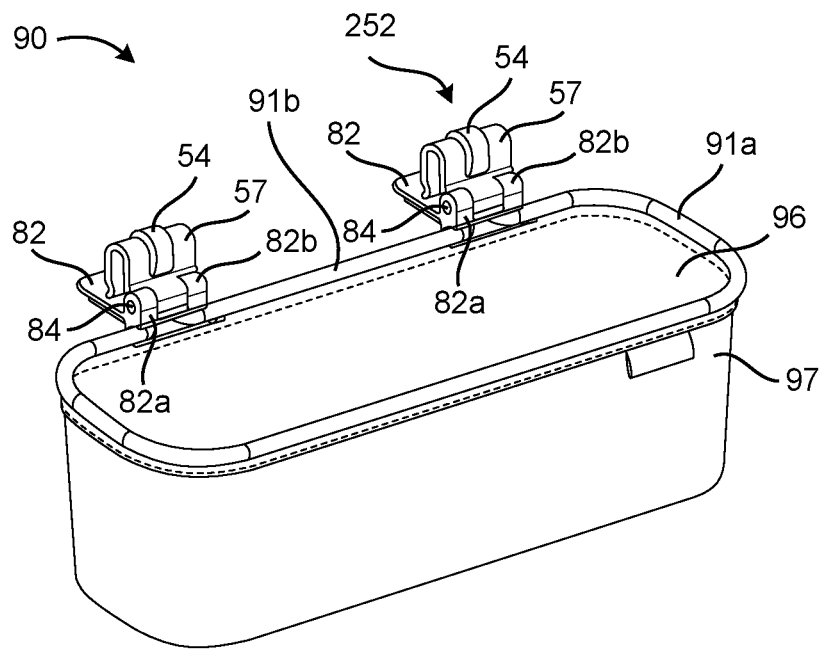
FIG. 18A is a perspective view of a utility basket of the present invention.
Figure 18B:
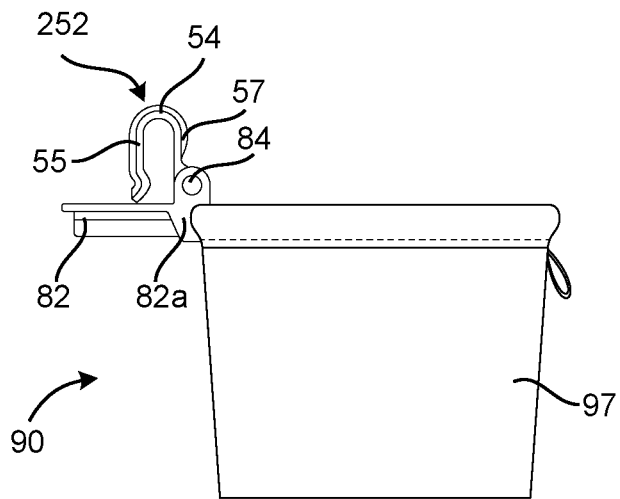
FIG. 18B is a side view of the utility basket of FIG. 18A.
Figure 18C:
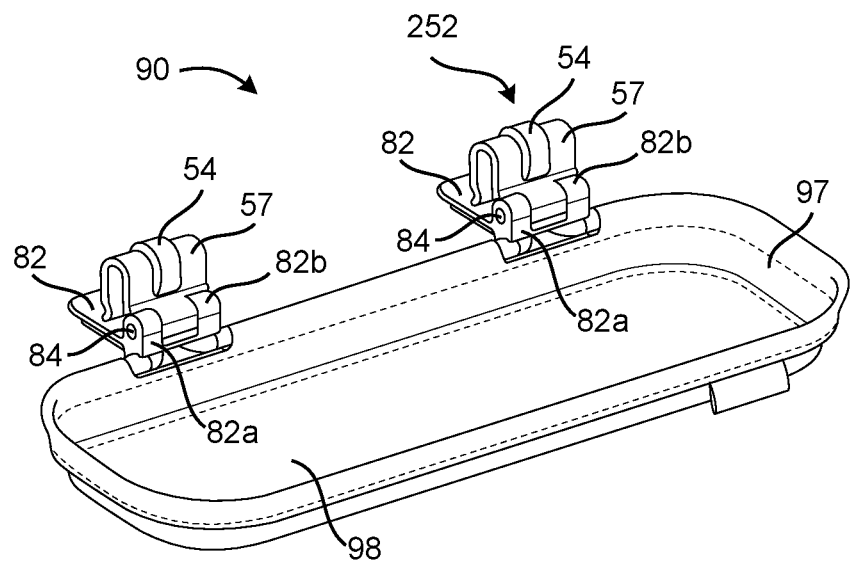
FIG. 18C is a perspective view of the utility basket of FIG. 18A in a collapsed state.

Referring to FIGS. 18A-18C, another embodiment of an accessory, namely, a utility basket 90, is shown. Similar to the cup holder 80 described above, the utility basket 90 includes a body section 97 constructed of a fabric material, which includes a bottom section 98 having a plastic board enclosed within the fabric material to provide additional support for multiple items capable of being stored therein. A top portion of the body section 97 is stitched around two wire rims 91a, 91b for providing support and forms an opening 96 for receiving the items. The wire rims 91a, 91b are constructed of a metal for strength and durability but other materials such as plastic could be used. The first wire rim 91a is substantially oval and disconnects on one side of the oval. The second wire rim 91b is substantially straight and is positioned on the disconnected portion of the first wire rim 91a. In this embodiment, two accessory clips 252 are utilized to provide sufficient support for multiple items stored in the utility basket 90. For the sake of brevity, the structural details and the method of use of the accessory clips 252 are described above and incorporated by reference. One end of the first wire rim 91a is fixed to a first end 82a of a first base member 82 and another end of the first wire rim 91a is fixed to a second end 82b of a second base member 82. As well, one end of the second wire rim 91b is fixed to a second end 82b of the first base member 82 and another end of the second wire rim 91b is fixed to a first end 82a of the second base member 82. When not in use the body section 97 is capable of collapsing, as shown in FIG. 18C, for convenient storage. While the utility basket 90 in this embodiment is substantially oval, the utility basket 90 could take on other forms as well. For example, the opening 96 and bottom section 98 could be square and the depth of the utility basket 90 could extend lower.

Figure 19A:
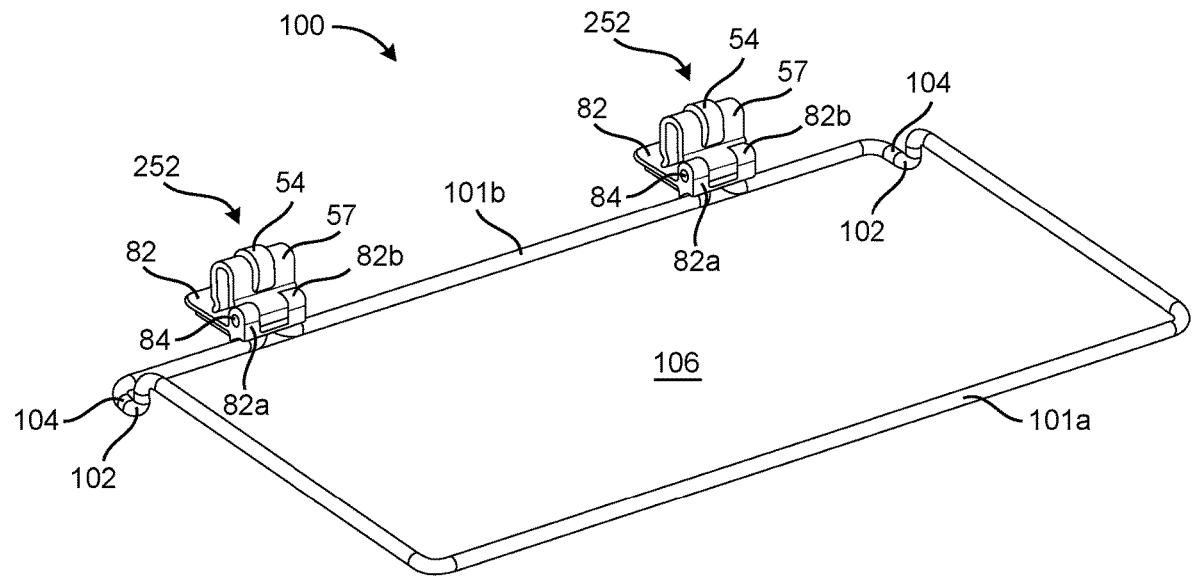
FIG. 19A is a perspective view of a trash bag holder of the present invention.
Figure 19B:
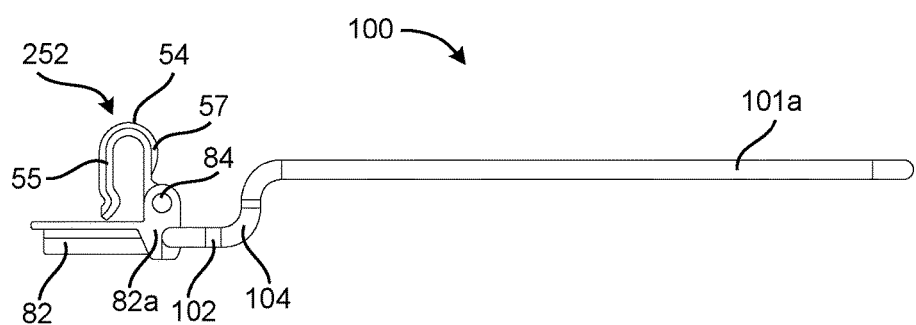
FIG. 19B is a side view of the trash bag holder of FIG. 19A.

Referring to FIGS. 19A and 19B, another embodiment of an accessory, namely, a trash bag holder 100, is shown. Similar to the utility basket 90 described above, two rim sections 101a, 101b are provided for support and forms an opening 106 for receiving a trash bag. The rim sections 101a, 101b are constructed of a metal for strength and durability but other materials such as plastic could be used.

The first rim section 101a is substantially rectangular and disconnects on one side. The second rim section 101b is substantially straight and is positioned on the disconnected portion of the first rim section 101a. The first rim section 101a includes an elbow 102 on each opposing corner to provide a lower engagement surface 104 for further securing a trash bag thereto. The first rim section 101a could be one continuous structure including the elbows 102 or separate fittings could be used for the elbows 104. In this embodiment, two accessory clips 252 are utilized to provide sufficient support for items stored in the trash bag. For the sake of brevity, the structural details and the method of use of the accessory clips 252 are described above and incorporated by reference. One end of the first rim section 101a is fixed to first end 82a of a first base member 82 and another end of the first rim section 101a is fixed to a second end 82b of a second base member 82. As well, one end of the second rim section 101b is fixed to a second end 82b of the first base member 82 and another end of the second rim section 101b is fixed to a first end 82a of the second base member 82. While the trash bag holder 100 in this embodiment is substantially rectangular, the trash bag holder 100 could take on other forms as well. For example, the opening 106 could be square or round. As well, the trash bag holder 100 could be used to hold any other type of bag such as a fabric laundry bag or plastic bags in general. The trash bag holder 100 could also be used to rest and/or secure other items thereon such as trays, clothing, etc.

Figure 20A:
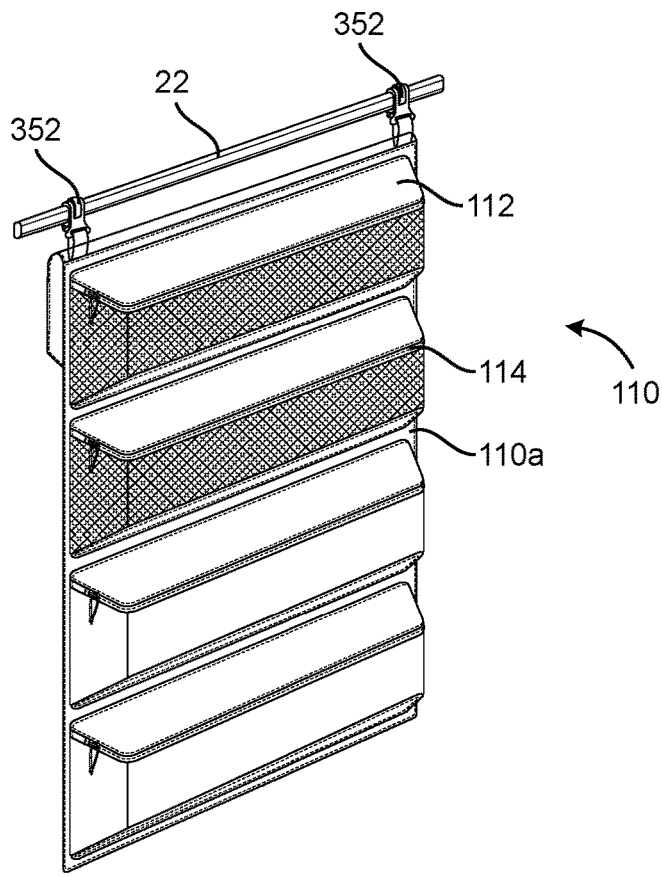
FIG. 20A is a front perspective view of a utility roll of the present invention.
Figure 20B:
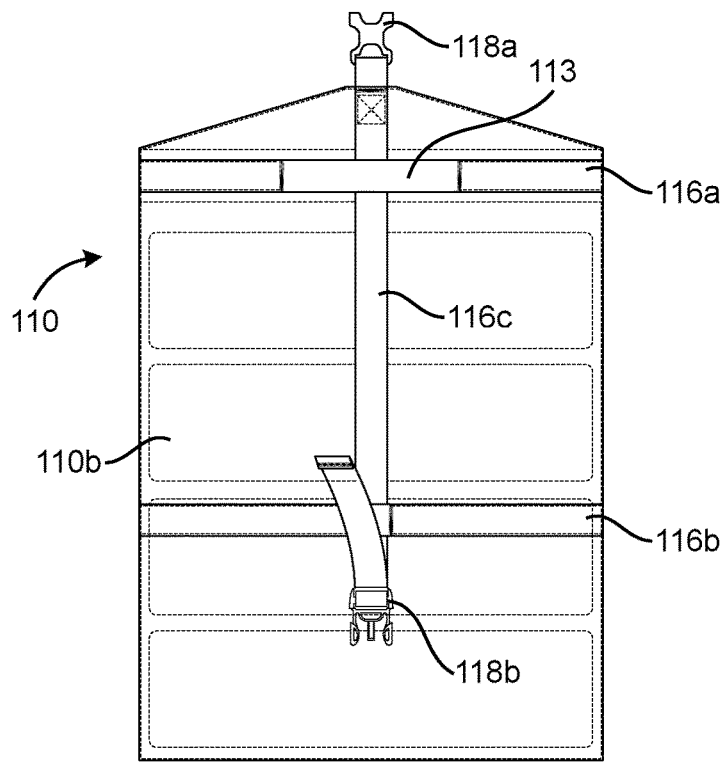
FIG. 20B is a rear view of the utility roll of FIG. 20A.
Figures 20C, 20D:
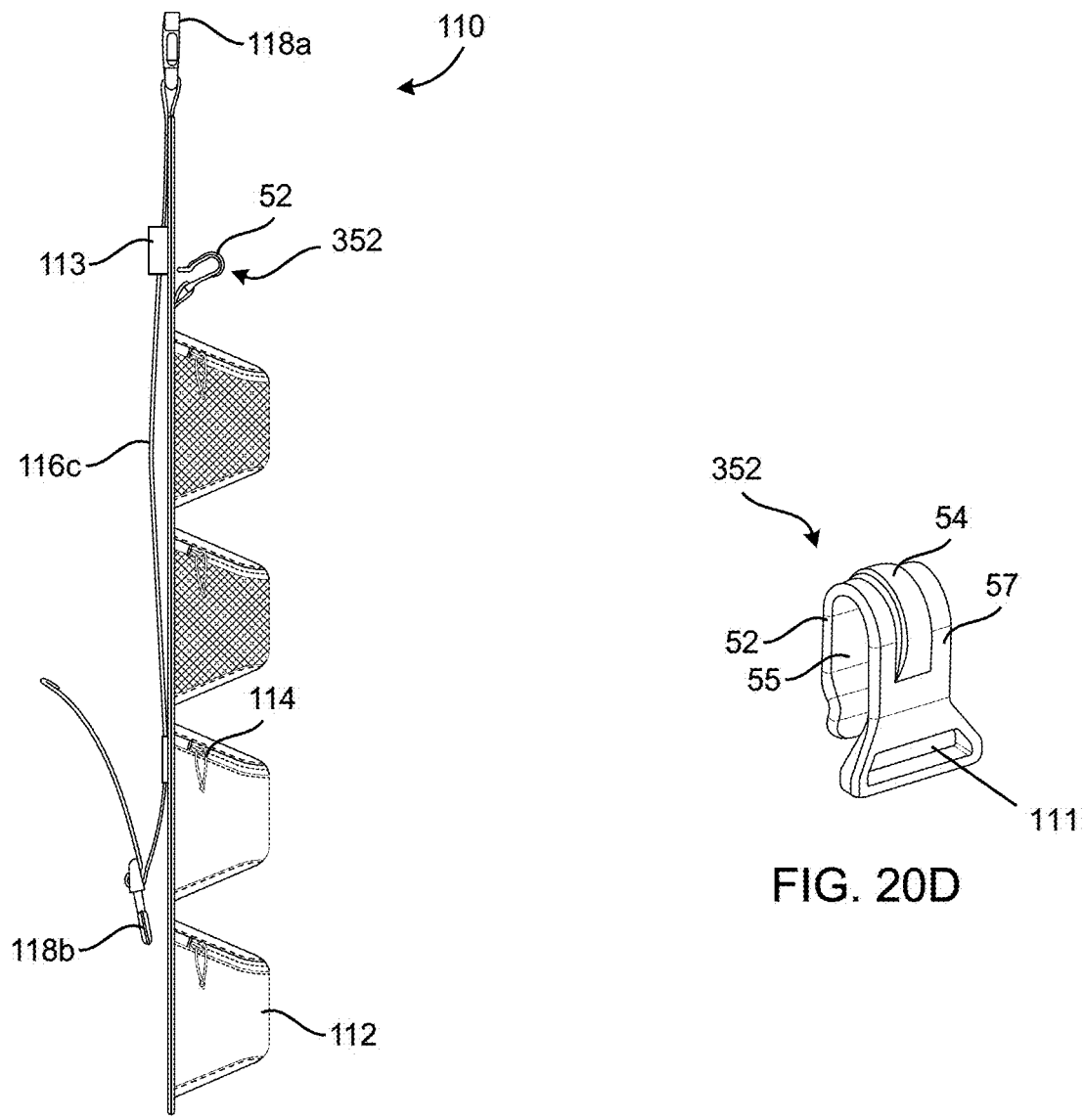
FIG. 20C is a side view of the utility roll of FIG. 20A.
FIG. 20D is a perspective view of another embodiment of an accessory clip of the present invention.
Figure 20E:
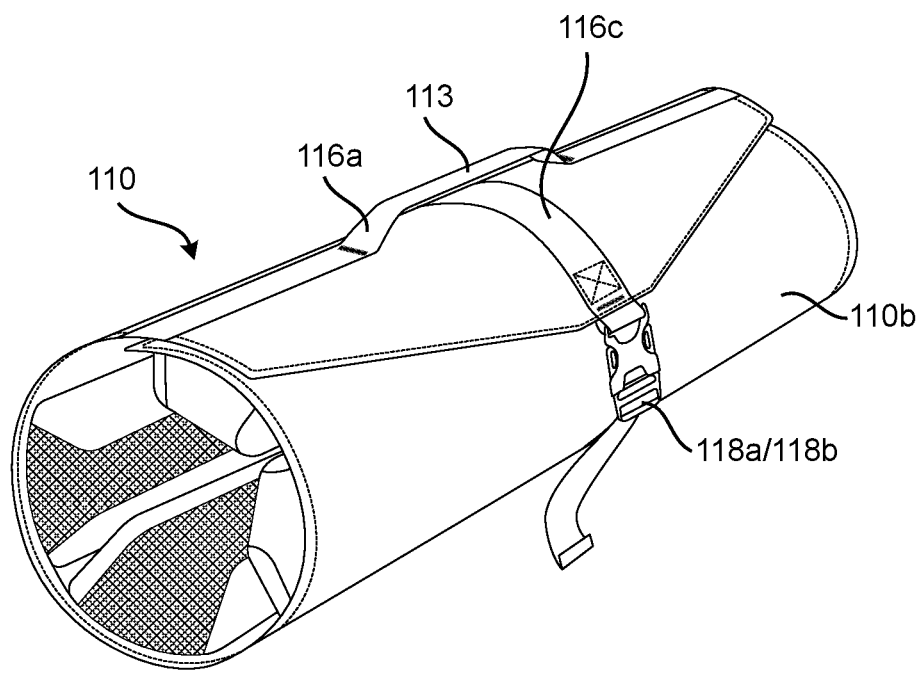
FIG. 20E is a perspective view of the utility roll of FIG. 20A in a packed state.

Referring to FIGS. 20A-20E, another embodiment of an accessory, namely, a utility roll 110, is shown. The utility roll 110 includes a plurality of compartments 112 on a front section 110a for storing items, as shown in FIG. 20A. In this embodiment, the compartments 112 are arranged horizontally from top to bottom and include fasteners 114 for opening and closing each compartment 112. However, each compartment 112 can be arranged in a different manner, e.g., vertically, and could take on different shapes and sizes as well. As well, other types of fasteners such as hook-and-loop fasteners could be used to open and close each compartment 112. As shown in FIG. 20D, the front section 110a is also provided with a pair of accessory clips 52, each with a slot 111 integrally formed and extending from the static member 57. For convenience, the accessory clip 52 and slot 111 combination will be referred to as accessory clip 352. An attachment strap or webbing extends through the slot 111 and is attached to a top portion of the front section 110a by stitching. As shown in FIG. 20B, a rear section 110b is provided with attachment straps such as webbing 116a, 116b, 116c for reinforcing the utility roll 110 and for providing a means for locking the utility roll 110 when rolled up, as shown in FIG. 20E. The horizontal webbing 116a, 116b is stitched onto the rear section 110b. Portions of the horizontal webbing 116a 116b, particularly portions located at or near a horizontal center line of the rear section 110b, are not attached to the rear section 110b, thereby forming spaces between the horizontal webbing 116a, 116b and the rear section 110b. As such, the vertical webbing 116c is positioned within the spaces, as shown in FIG. 20C. The portions of the horizontal webbing 116a, 116b near the horizontal center line of the rear section 110b can also act as handles 113, as shown in FIG. 20E. The vertical webbing 116c is provided with a buckle assembly, specifically a female buckle part 118a on one end and a male buckle part 118b on an opposing end. In this embodiment, the male buckle part 118b is also provided with a slot for adjusting the length of the vertical webbing 116c. The utility roll 110 could be provided with rigid inserts such as a flexible plastic plate between the front and rear sections 110a, 110b to provide additional structure and support. In use, the utility roll 110 is attached to the rail 22 via the accessory clips 52, as shown in FIG. 20A, as described above. For the sake of brevity, the method of attaching the accessory clips 52 to the rail described above is incorporated by reference. When a user wishes to store or transport the utility roll 110, the accessory clips 52 are detached from the rail 22 and the utility roll 110 is rolled up with the compartments 112 positioned on the inside of the roll. The female and male buckle parts 118a, 118b are engaged and the vertical webbing 116c is tightened through the slot of the male buckle part 118b to secure the utility roll 110 in a rolled-up state as shown in FIG. 20E.

Figure 21A:
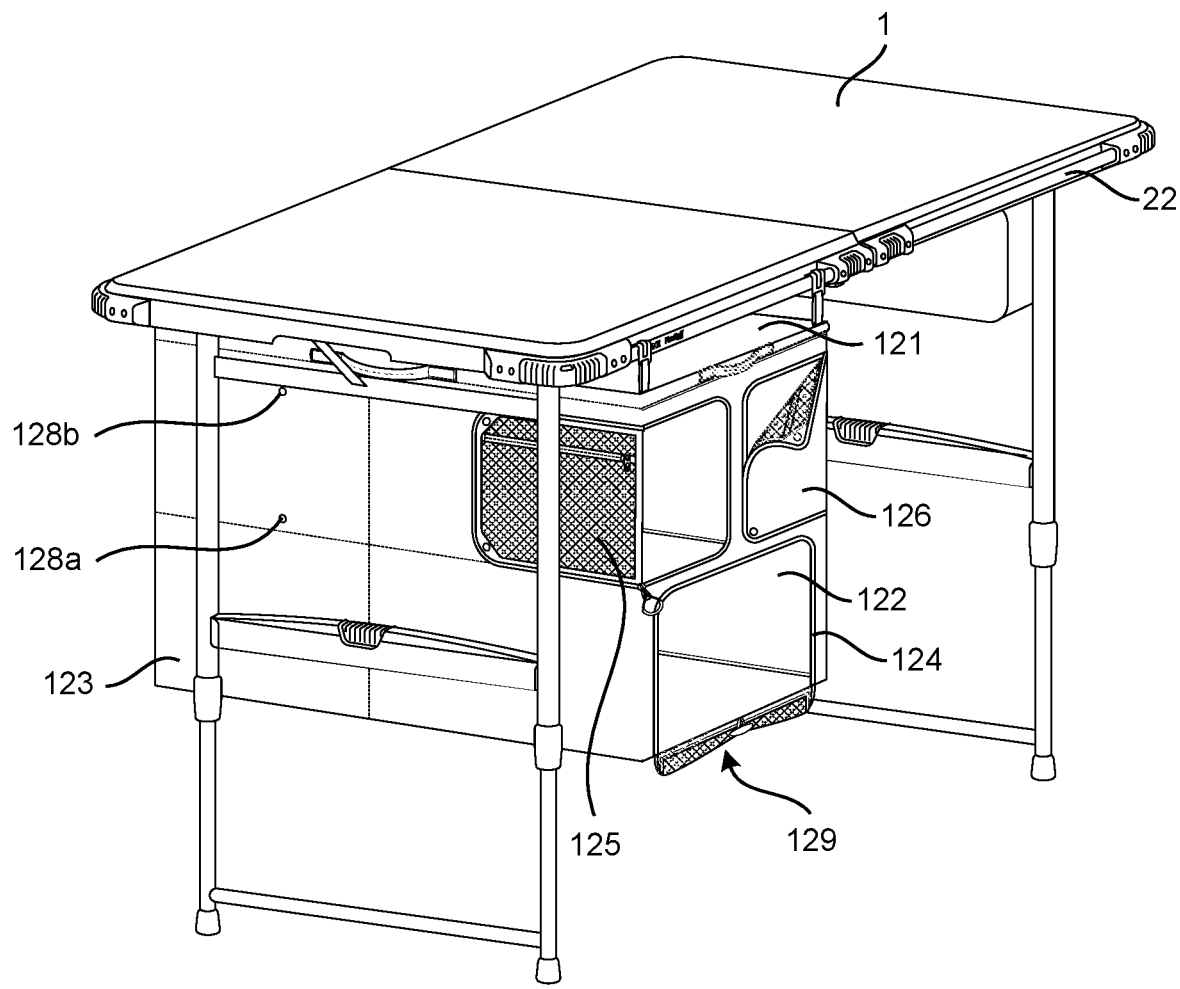
FIGS. 21A and 21B are illustrations of a storage unit of the present invention.
Figure 21B:
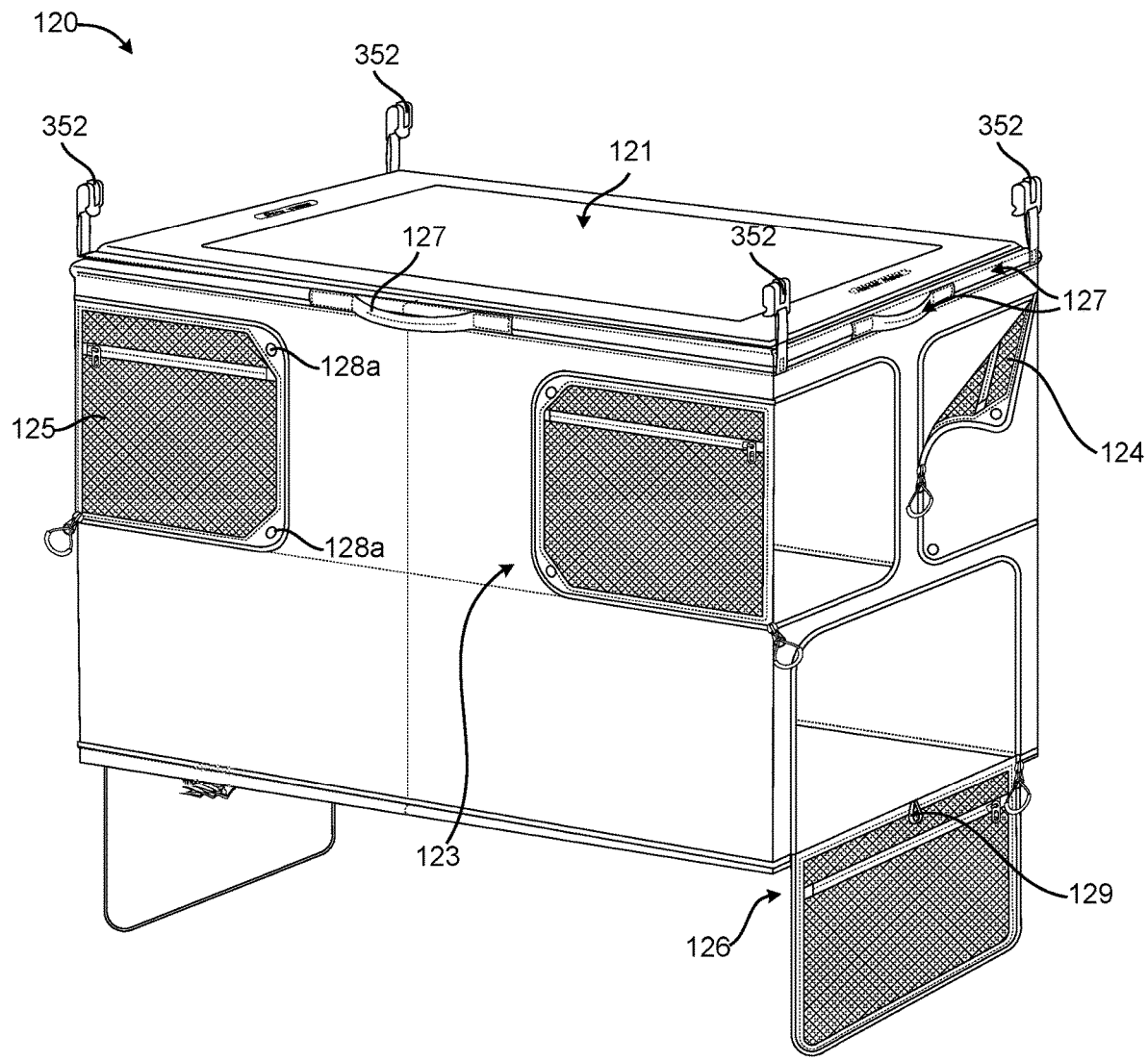

Referring to FIGS. 21A and 21B, another embodiment of an accessory, namely, a storage unit 120, is shown. The storage unit 120 includes a plurality of compartments 122 with fasteners 124 for opening and closing each compartment 122. Other types of fasteners such as hook-and-loop fasteners could be used to open and close each compartment 122. In this embodiment, the compartments 122 are arranged in two levels with smaller compartments on the top level and larger compartments on the bottom level, however, each compartment 122 can be arranged in a different manner and could take on different shapes and sizes as well. In this embodiment, each top compartment includes doors 126 having a first locking member 128a for securing to a second locking member 128b located on an outer surface of a side section 123. As such, the doors 126 can be locked in an open position. Each door 126 is also provided with a mesh zipper pocket 125 for storing items within. In this embodiment, the bottom doors are provided with a loop and toggle fastener 129 so that the bottom door can be rolled up and secured to an open state. A top section 121 is provided with a thermoformed Kydex plastic with a recessed center to provide structure to the storage unit 120 to prevent it from collapsing or deforming when in use. Handles 127 are also provided along top side edges. Each top corner of the storage unit 120 is provided with the accessory clip 352, as shown in FIG. 20D, having a webbing extending therethrough, with the webbing attached to the top corners by stitching. In use, the storage unit 120 is attached to rails 22 via the accessory clips 52, as shown in FIG. 21A, as described above. For the sake of brevity, the method of attaching the accessory clips 52 to the rail 22 described above is incorporated by reference.

Figure 22A:
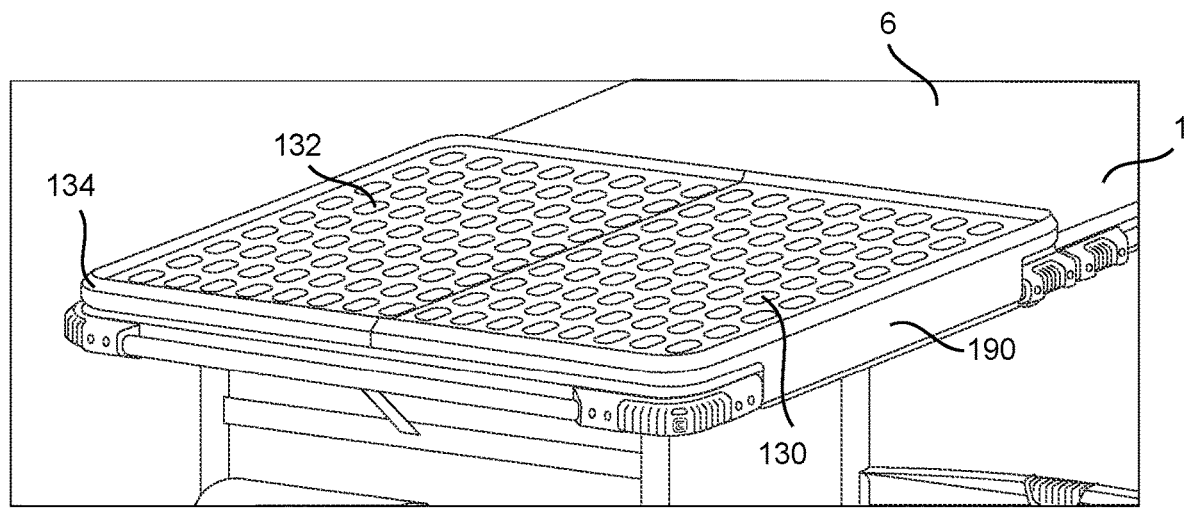
FIGS. 22A and 22B are illustrations of a grill unit of the present invention.
Figure 22B:
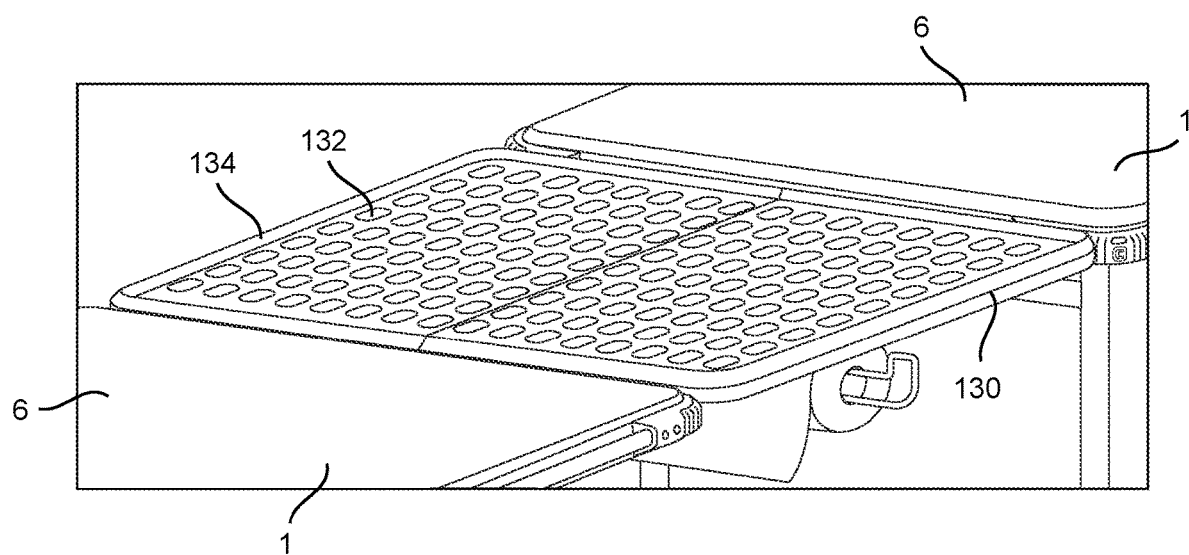

Referring to FIGS. 13, 14, 22A and 22B, another embodiment of an accessory, namely, a multi-purpose grill surface 130, is shown. The grill surface 130 can be used to cook on, used as an additional elevated surface and even used as an attachment member for attaching tables with the rail system 20 together. The grill surface 130 includes a top surface 132 constructed of metal and includes a plurality of apertures. Edges 134 of the grill surface are constructed of plastic. As shown in FIG. 13, the grill surface 130 includes a folding leg assembly having four downwardly extending legs 136 with accessory clips 152 attached thereto, as shown in FIGS. 10A-10D. The legs 136 are pivotably attached to the bottom of the grill surface 130 and are capable of being locked into place when the grill surface 130 is in use and elevated above the table top 6, as shown in FIG. 13. The accessory clips 152 are attached to the rails 22 as described above, details of which are incorporated by reference. Opposing sides of the edges 134 include another embodiment of an accessory clip, specifically, a locking member 190, as shown in FIG. 23D, which is integrally formed therewith. That is, the edges 134 and locking member 190 are formed by injection molding plastic as a single piece. The locking member 190 includes a downwardly extending flexible member 192 having an inner engagement surface 194 and an outwardly extending engagement member 196 at a bottom end thereof. As shown in FIG. 22A, when the legs are folded, the grill surface 130 is capable of attaching to the table top by engaging the locking member 190 with opposing rails 22. Specifically, the user engages the flexible member 192 downwardly on the rail 22 and the flexible member 192 expands when making contact with the outer surface of the rails 22. The flexible member 192 contracts and returns to its normal, rested state when the engagement surface 194 fully engages the outer surface of the rails 22. As such, the grill surface is secured to the table top 6 and is capable of storage and transport while attached to the table 1, as shown in FIG. 22A. As shown in FIG. 22B, the grill surface 130 can also be used to connect adjacent tables 1 in the same manner. To remove the grill surface 130, the user engages the engagement member 196 by pulling away from the rail 22 and applying an upward force to disengage the locking member 190 from the rail 22.

Figure 23A:
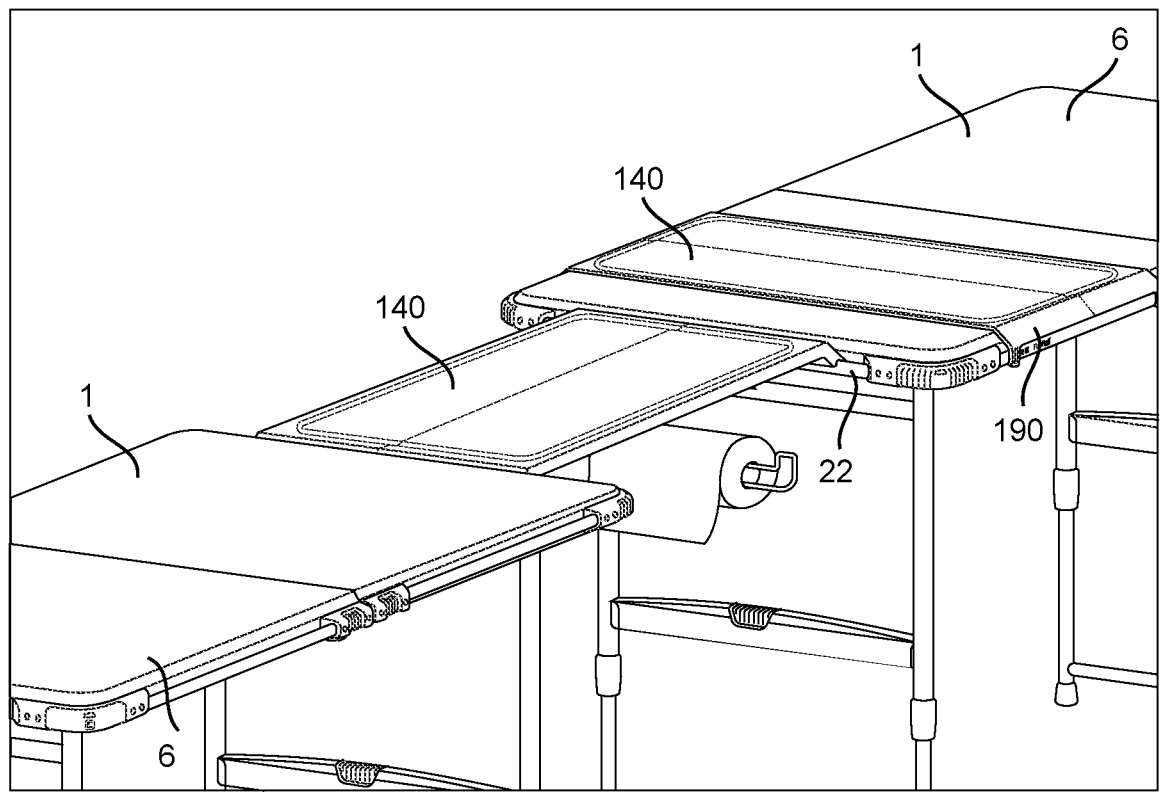
FIGS. 23A to 23C are illustrations of embodiments of a cutting board of the present invention.
Figure 23B:
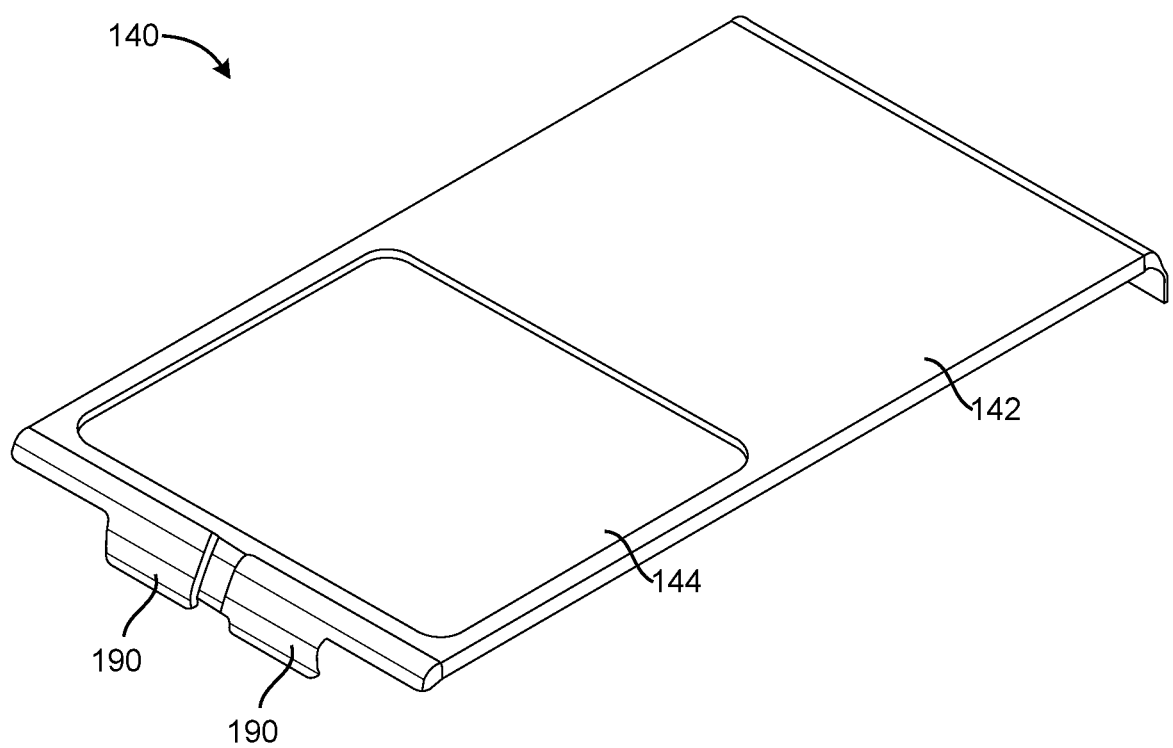
Figure 23C:
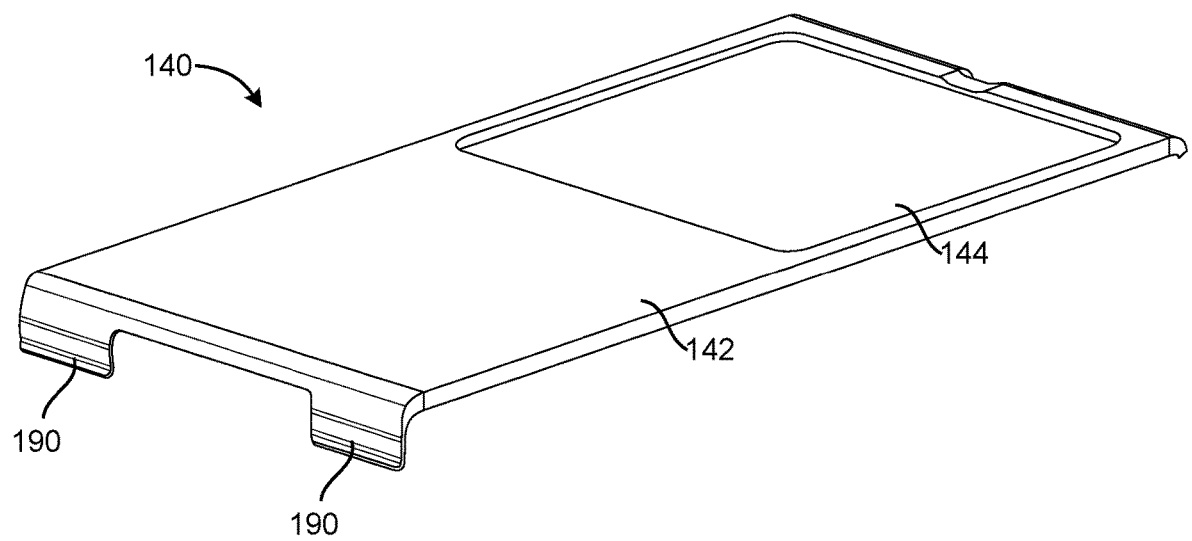
Figure 23D:
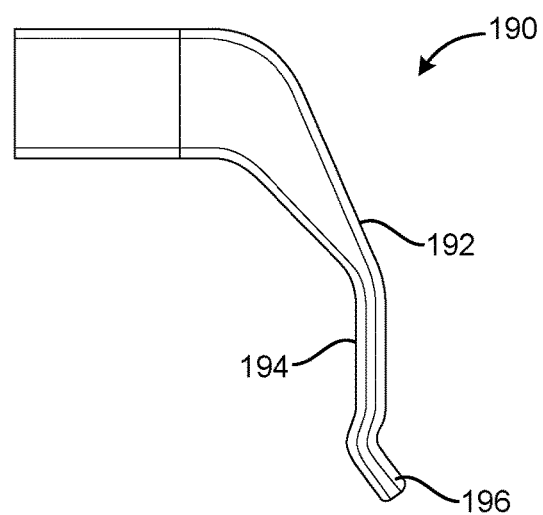
FIG. 23D is a side view of another embodiment of an accessory clip of the present invention.

Referring to FIGS. 13, 14 and 23A-23C, another embodiment of an accessory, namely, a cutting board 140, is shown. Several examples of the cutting board are shown. In the embodiment shown in FIGS. 13, 14 and 23A, the cutting board 140 includes a substantially flat cutting surface 142 and two spaced apart locking members 190. In the embodiment shown in FIG. 23C, while the locking members 190 are spaced apart, the cutting surface 142 includes a recessed portion 144 for containing liquids from foodstuffs cut thereon. In the embodiment shown in FIG. 23B, the cutting surface 142 includes a recessed portion 144 but the locking members 190 are side-by-side. Similar to the grill surface 130 described above, the cutting board 140 is capable of attaching to the table top 6, as shown in FIGS. 13, 14 and 23A, and also capable of attaching two adjacent tables 1 together, as shown in FIG. 23A, using the locking members 190. The method of doing so is described in detail above and incorporated by reference.

As shown in FIGS. 13 and 14, various other accessories can be securely attached to the rails 22 of the rail system 20 of the present invention. For example, in addition to the accessories described above, an accessory storage unit, a spice basket, a knife rack and an elevated table surface, among other things, can utilize an accessory clip 52, 152, 252, 352 or locking member 190 to attach to the rails 22. One of ordinary skill in the art will recognize that the types of accessories are not limited to those described herein.

As well, the accessory clips 52, 152, 252, 352 and locking member 190 described herein could be formed integral to an accessory during manufacture, or manufactured separate from an accessory and attachable to accessories rather than being integrally formed during manufacture. Although the accessory clips 52, 152, 252, 352 and locking member 190 described herein are plastic, they could also be manufactured with other materials, such as metal.

Moreover, the rail system 20 of the present invention is not limited to use on furniture shown and described herein. For example, the rail system 20 could be used on other objects and structures such as coolers, transportable wagons, automobiles, boats and walls, to name a few.

As described above, the rail system 20 of the present invention provides a means for securely attaching accessories to the rails 22. As well, the rail system 20 provides reinforcement along objects such as those describe herein to prevent damage thereto. Finally, the rail system 20 acts as a gripping feature for the user when transporting objects.

The present invention may be embodied in other specific forms without departing from its spirit or essential characteristics. The described embodiments are to be considered in all respects only as illustrative and not restrictive. The scope of the invention, therefore, will be indicated by claims rather than by the foregoing description. All changes, which come within the meaning and range of equivalency of the claims, are to be embraced within their scope.

The invention claimed is:

1. A system for attaching accessories, the system comprising:
   at least one rail operably coupled to an object forming a rail space therebetween, the at least one rail being elongate and having an inner surface and an opposing outer surface; and
   at least one accessory, the accessory having an accessory clip for attaching to the at least one rail, the accessory clip comprising:
      a flexible member having an inner surface and an opposing outer surface,
      a static member having an inner surface and an opposing outer surface, the static member and flexible member opposing each other and connected at an intermediate portion of the accessory clip,
      wherein an inner space is formed between the flexible member and the static member;
      a reinforcement member positioned on the outer surface of the flexible member and the static member at the intermediate portion of the accessory clip and extending continuously thereon,
      wherein the flexible member, static member and reinforcement member are integrally formed together;
   wherein in an engaged state, one of the static member and flexible member is positioned within the rail space and engaged with the inner surface of the at least one rail, and the inner surface of the other of the static member and flexible member is engaged with the outer surface of the at least one rail, such that the at least one rail encompasses the inner space.

2. The system of claim 1, wherein the accessory clip further comprises a base member pivotably coupled to a lower end of the static member.

3. The system of claim 2, wherein in the engaged state, the base member engages a lower surface of the at least one rail.

4. The system of claim 1, wherein the at least one accessory is selected from a group consisting of a cup holder, a utility basket, a trash bag holder, a utility roll, a storage unit, a grill surface and a cutting board.

5. The system of claim 1, further comprising a bumper configured to receive the at least one rail, wherein the bumper and the at least one rail are coupled together to the object by a fastener.

6. The system of claim 1, wherein the static member is in a vertical position when in the engaged state.

7. The system of claim 6, wherein the flexible member is in a vertical position when in the engaged state.

8. A system for attaching accessories, the system comprising:
   at least one rail operably coupled to an object, the at least one rail being elongate and having an inner surface and an opposing outer surface; and
   at least one accessory, the accessory having an accessory clip for attaching to the at least one rail, the accessory clip comprising:
      a flexible member having an inner surface and an opposing outer surface, a static member having an inner surface and an opposing outer surface, the static member and flexible member opposing each other and connected at an intermediate portion of the accessory clip, and;

a reinforcement member positioned on the outer surface of the flexible member and the static member at the intermediate portion of the accessory clip and extending continuously thereon;

wherein in an engaged state, the inner surface of one of the static member and flexible member is engaged with the inner surface of the at least one rail, and the inner surface of the other of the static member and flexible member is engaged with the outer surface of the at least one rail.

9. The system of claim 8, wherein the accessory clip further comprises a base member pivotably coupled to a lower end of the static member.

10. The system of claim 9, wherein in the engaged state, the base member engages a lower surface of the at least one rail.

11. The system of claim 8, wherein the static member is in a vertical position when in the engaged state.

12. The system of claim 11, wherein the flexible member is in a vertical position when in the engaged state.

13. The system of claim 8, wherein the flexible member and static member are integrally formed together.

14. A system for attaching accessories, the system comprising:
a rail operably coupled to an object, the rail being elongate and having an inner surface and an opposing outer surface; and an accessory, the accessory having an accessory clip for attaching to the rail, the accessory clip comprising a flexible member having an inner surface and an opposing outer surface, an opposing static member having an inner surface and an opposing outer surface, the flexible member and static member connected at an intermediate portion of the accessory clip, and a reinforcement member positioned on the outer surface of the flexible member and the static member at the intermediate portion of the accessory clip and extending continuously thereon;

wherein in an engaged state, the inner surface of the flexible member is engaged with one of the inner surface and outer surface of the rail.

15. The system of claim 14, wherein in the engaged state, the inner surface of the static member is engaged with one of the inner surface and outer surface of the rail.

16. The system of claim 15, wherein the accessory clip further comprises a base member pivotably coupled to a lower end of the static member.

17. The system of claim 16, wherein in the engaged state, the base member engages a lower surface of the rail.

18. The system of claim 15, wherein the static member further comprises a slot positioned at a lower end thereof, the slot configured to receive an attachment strap.

19. The system of claim 14, wherein the static member is in a vertical position when in the engaged state.

20. The system of claim 19, wherein the flexible member is in a vertical position when in the engaged state.

\* \* \* \* \*